United States Patent
Fenn et al.

(10) Patent No.: US 8,534,435 B2
(45) Date of Patent: *Sep. 17, 2013

(54) ACTUATING DEVICE FOR A FRICTION CLUTCH DEVICE AND TORQUE TRANSMISSION DEVICE FORMED BY THE SAME

(75) Inventors: Peter Fenn, Waigolshausen (DE); Andreas Ratte, Dittelbrunn (DE); Klaus Reuter, Oberthulba (DE); Ralf Steinfeldt, Schwebenried (DE); Matthias Reisch, Ravensburg (DE); Juergen Wafzig, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 308 days.

This patent is subject to a terminal disclaimer.

(21) Appl. No.: 12/920,322
(22) PCT Filed: Oct. 22, 2008
(86) PCT No.: PCT/EP2008/064267
§ 371 (c)(1),
(2), (4) Date: Aug. 31, 2010
(87) PCT Pub. No.: WO2009/109242
PCT Pub. Date: Sep. 11, 2009

(65) Prior Publication Data
US 2011/0005886 A1    Jan. 13, 2011

(30) Foreign Application Priority Data
Mar. 6, 2008 (DE) .......................... 10 2008 012 894

(51) Int. Cl.
*F16D 27/08* (2006.01)
*F16D 11/00* (2006.01)
*F16D 19/00* (2006.01)

(52) U.S. Cl.
USPC ....... 192/48.2; 192/84.6; 192/82 R; 192/84.8; 192/94

(58) Field of Classification Search
USPC ...................... 192/84.6, 48.2, 40, 94
See application file for complete search history.

(56) References Cited

U.S. PATENT DOCUMENTS

| 2,893,524 | A | * | 7/1959 | Ferrier .......................... 192/3.28 |
| 5,934,433 | A | * | 8/1999 | Leimbach et al. ........... 192/93 A |
| 6,006,883 | A | * | 12/1999 | Husse et al. ................ 192/70.23 |
| 6,431,338 | B1 | * | 8/2002 | Naito et al. ................ 192/70.252 |

(Continued)

FOREIGN PATENT DOCUMENTS

| DE | 198 51 466 A1 | 5/2000 |
| DE | 102 38 118 A1 | 4/2003 |

(Continued)

*Primary Examiner* — David D Le
*Assistant Examiner* — Colby M Hansen
(74) *Attorney, Agent, or Firm* — Davis & Bujold, PLLC

(57) ABSTRACT

An actuating device for applying actuating forces in a friction clutch device for engaging and disengaging a friction clutch assembly of the friction clutch device. The torque transmission device comprises the actuating device for transmission of torque between a drive unit and a transmission which also includes the friction clutch device. A method for installing a torque transmission device of this type. Various aspects relate to setting of a pre-load on a bearing of the actuating device, setting an over-dead-point configuration for a compensation spring associated with at least one rotary member of the actuating device, setting a rotation movement range for the rotary member and/or an axial movement range for an actuating element which can be displaced axially by rotation movement imparted to the rotary member, and producing either a normally engaged or disengaged characteristic in a normally-engaged or normally-disengaged friction clutch assembly with the compensation spring.

33 Claims, 21 Drawing Sheets

(56) References Cited

U.S. PATENT DOCUMENTS

2010/0006386 A1  1/2010  Ahnert et al.
2011/0005345 A1* 1/2011  Reisch et al. .............. 74/473.36

FOREIGN PATENT DOCUMENTS

| DE | 10 2004 001 569 A1 | 7/2004 |
| DE | 103 13 450 A1 | 10/2004 |
| DE | 103 48 312 A1 | 5/2005 |
| DE | 10 2005 048 737 A1 | 4/2007 |
| DE | 10 2006 010 248 A1 | 9/2007 |
| EP | 1 400 716 A1 | 3/2004 |

* cited by examiner

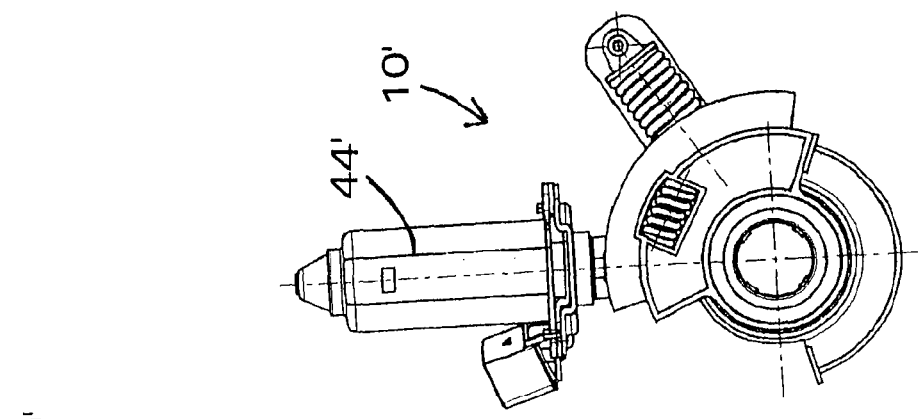
Fig. 17
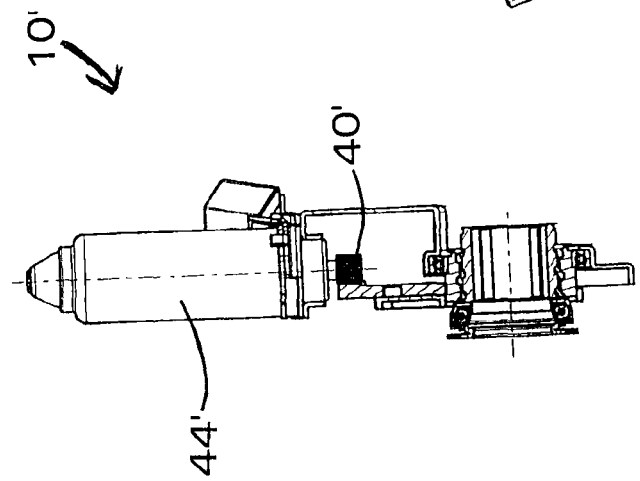
Fig. 18
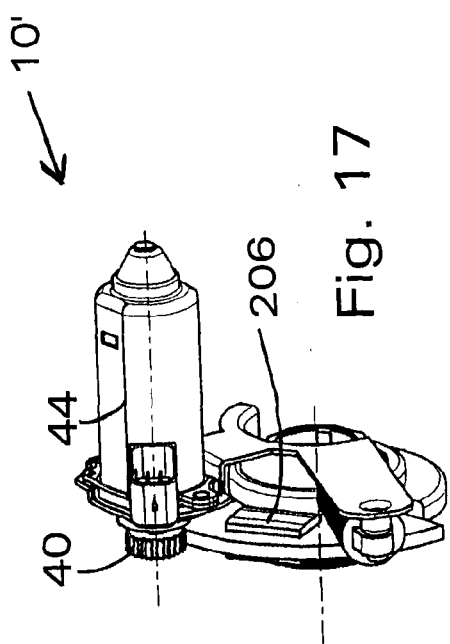
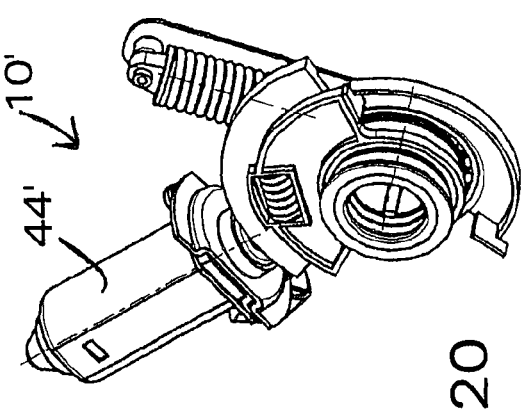
Fig. 19
Fig. 20

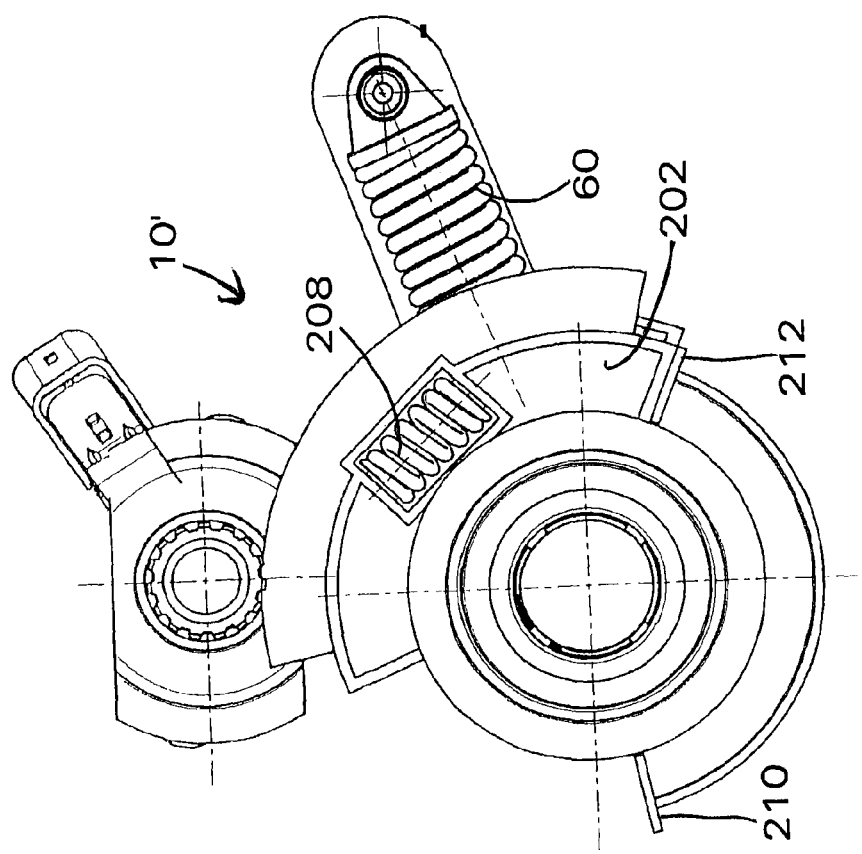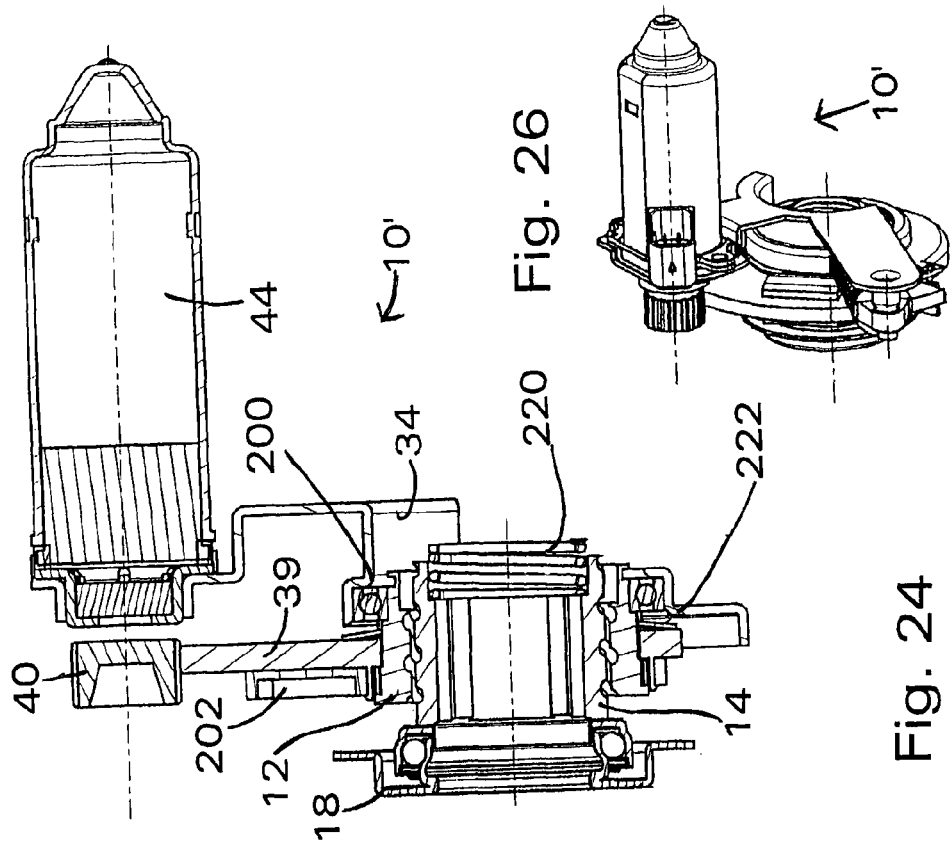

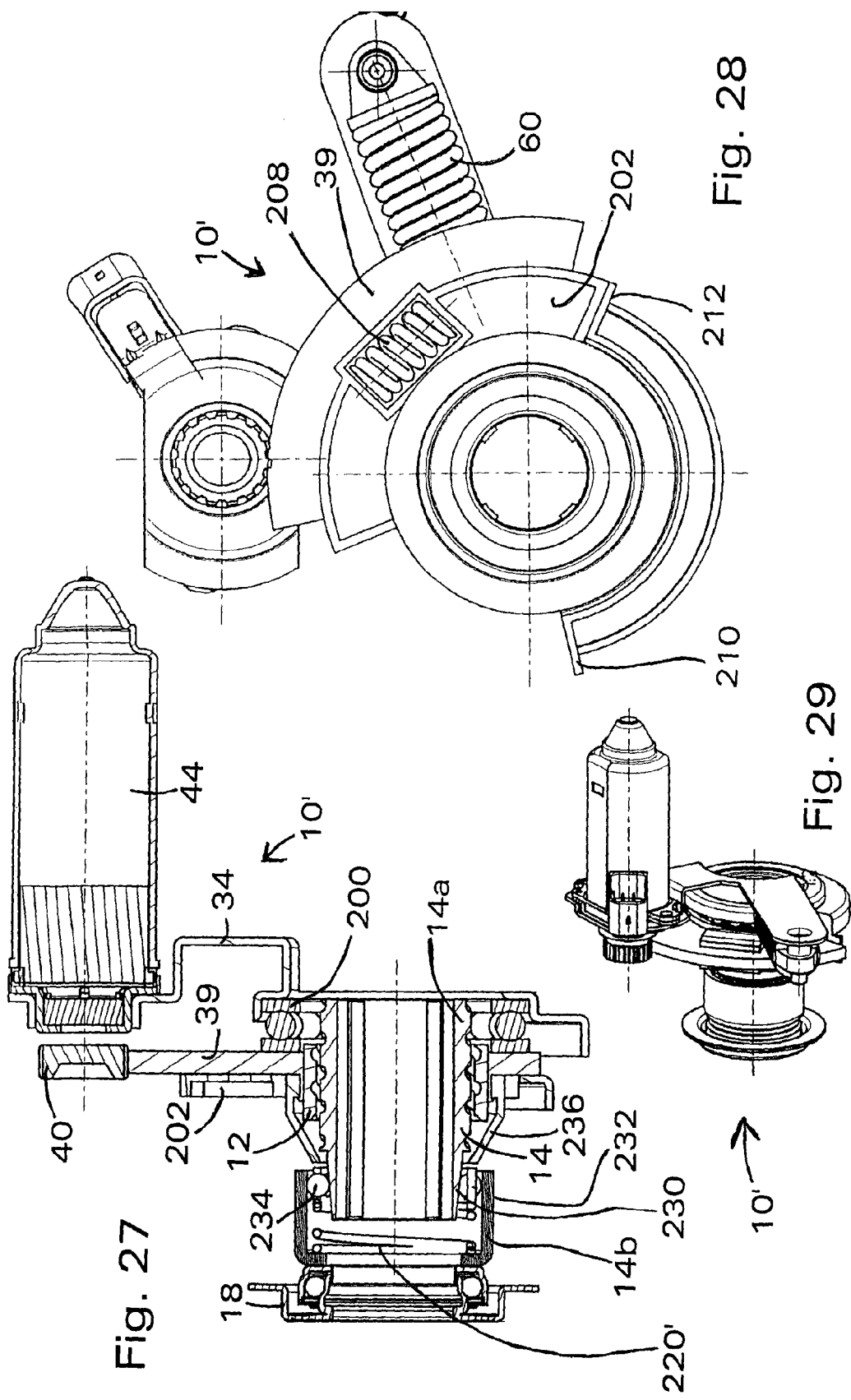

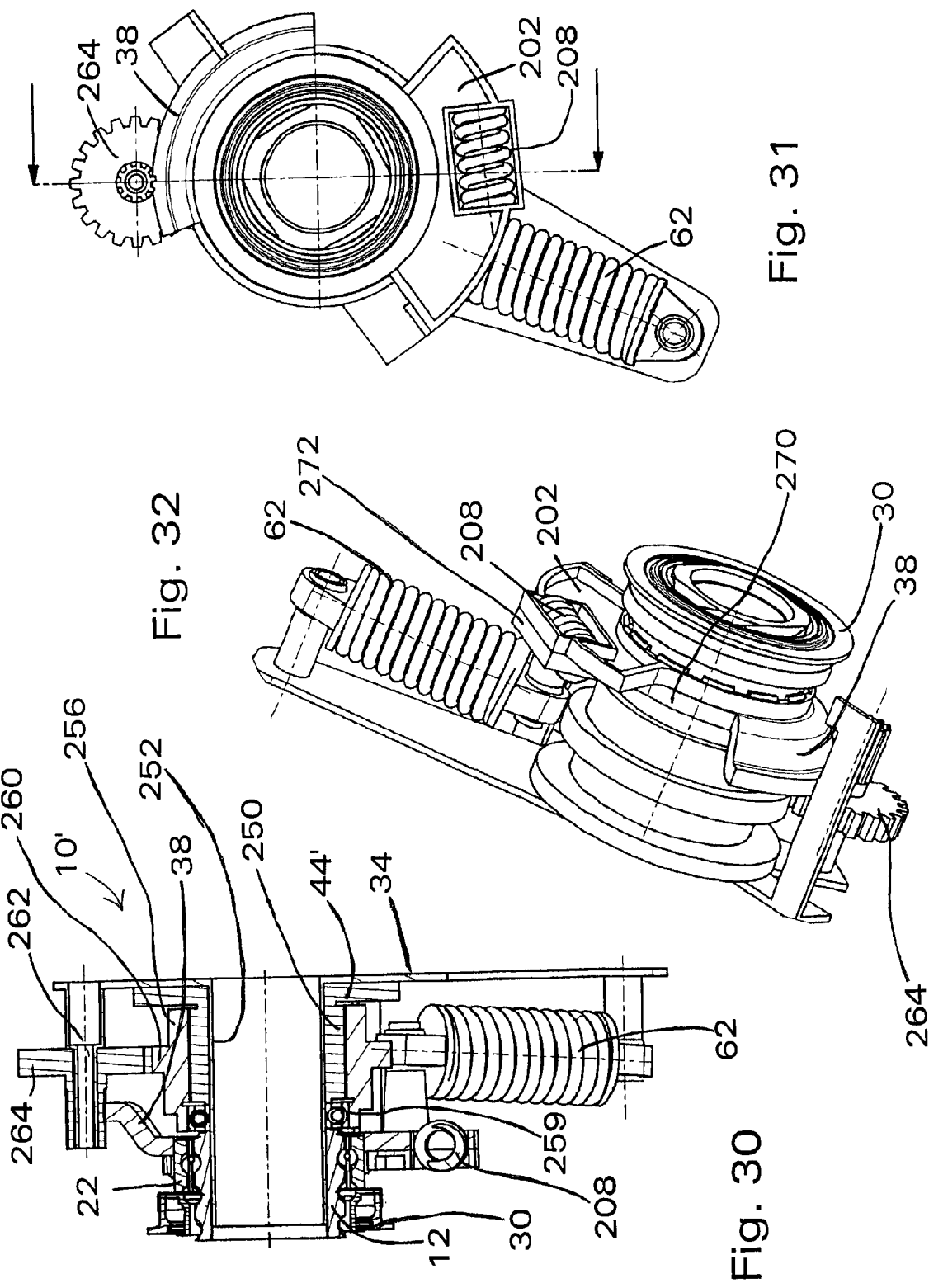

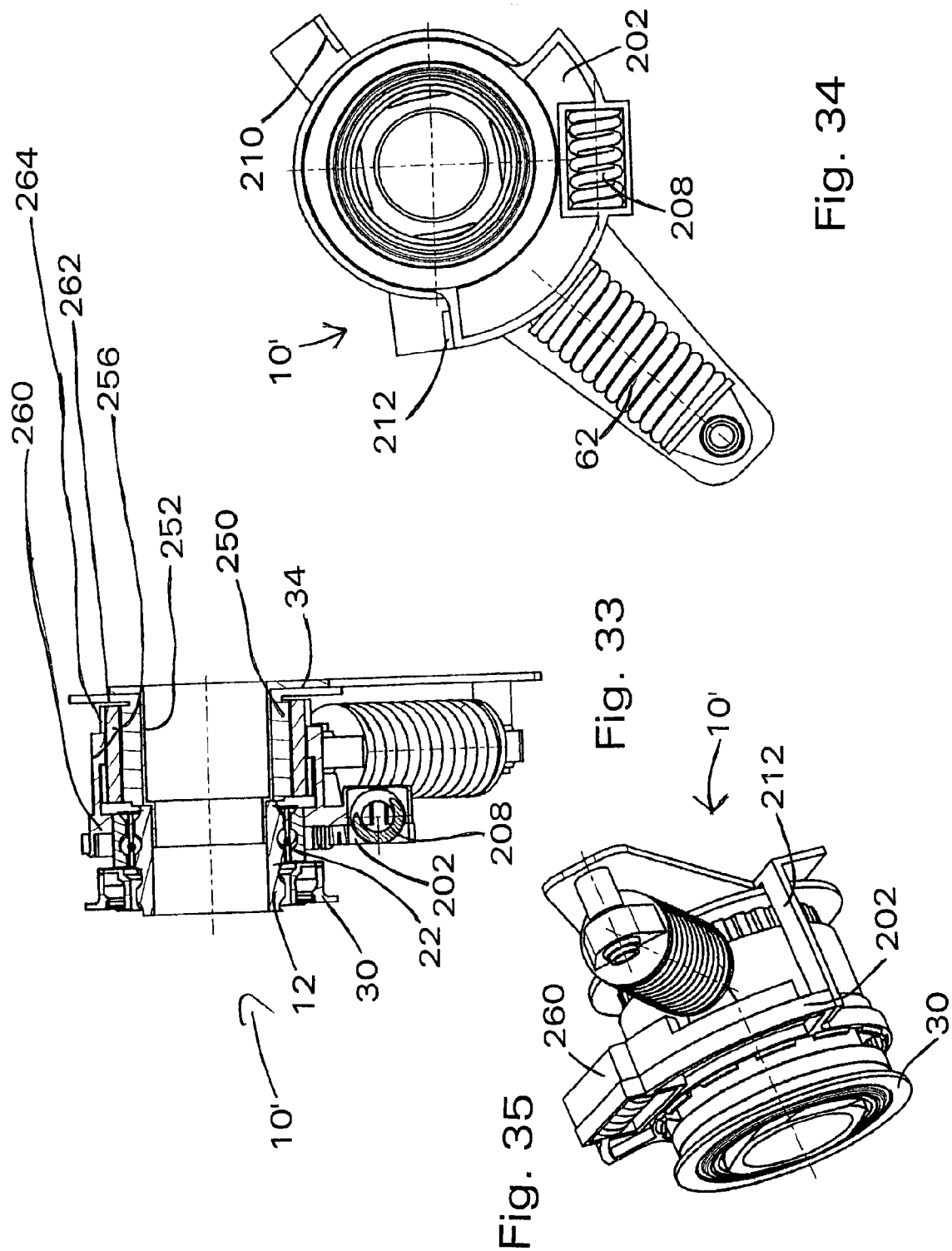

ACTUATING DEVICE FOR A FRICTION CLUTCH DEVICE AND TORQUE TRANSMISSION DEVICE FORMED BY THE SAME

This application is a National Stage completion of PCT/EP2008/064267 filed Oct. 22, 2008, which claims priority from German patent application serial no. 10 2008 012 894.5 filed Mar. 6, 2008.

FIELD OF THE INVENTION

In one of its aspects the present invention concerns in general terms a torque transmission device for the transmission of torque in a drivetrain of a motor vehicle between a drive unit and a transmission, which comprises:
- a friction clutch device comprising at least one friction clutch assembly that can optionally be actuated to engage or disengage it;
- an actuating device for applying actuating forces, in particular engagement or disengagement forces, to the friction clutch device, in order to actuate at least one friction clutch assembly of the friction clutch device in the engagement or disengagement direction, the actuating device comprising:
- at least one axially movable actuating element associated with the, or with a friction clutch assembly, and at least one axially substantially fixed supporting element associated with the actuating element, such that to actuate the associated friction clutch assembly, by virtue of rotational movement imparted to a rotary member of the actuating element, the actuating element can be moved in axial translation, and the actuating element or the supporting element serves as the rotary member or a rotary member separate from but co-operating with the actuating element and the supporting element is provided,
- at least one actuator associated with the rotary member and the friction clutch assembly, by means of which first rotational forces can be exerted on the rotary member in order to actuate the friction clutch assembly.

BACKGROUND OF THE INVENTION

From DE 10 2005 048 737 A1 an actuating device for a torque transmission device of this type is known, which is provided for actuating a dual friction clutch device which comprises a first friction clutch assembly associated with a first actuating element of the actuating device, and a second friction clutch assembly associated with a second actuating element of the actuating device. A particular feature of the known actuating device is that the two friction clutch assemblies cannot be actuated independently of one another, since the two actuating elements are displaced axially in opposite directions by a rotary member separate from the actuating elements and the supporting elements. Between the rotary member and the supporting element there act two compensation springs made as compression springs, which together with actuation reaction forces or restoring forces on the part of the friction clutch device, compensate the respective friction clutch assembly more exactly, partially or completely in relation to the respective actuating element depending on the rotation angle, so that in a central rotation angle zone of the rotation displacement range of the rotary member, which is referred to in the publication as the coupling and drive element, a resultant rotational force on the rotary member disappears, but increases quantitatively in the direction towards the angular limits of the rotation displacement range and acts in the direction of an approach toward the angular limit. The central feature of this special design is the at least partial reciprocal compensation, on the one hand of the actuation reaction forces or restoring force from one of the friction clutch assembles, and on the other hand of the actuation forces or restoring forces of the other friction clutch assembly.

From DE 10 2006 010 248 A6 it is known per se to impart to a clutch system of the "Normally Open" (or NO) type the character of a clutch system of the "Normally Closed" (or NC) type by using a gearwheel segment with a push-rod in an over-dead-point configuration. To assist an actuator made as an electric motor that acts upon the gearwheel segment a compensation spring in the form of a compression spring is articulated to the gearwheel segment, which acts during the engagement process in a rotational direction that corresponds to engagement of the clutch device. The gearwheel segment has at least two stops, with corresponding stops on a static housing of the actuating device, such that one stop corresponds to a fully disengaged clutch device and the other stop corresponds to an essentially fully engaged clutch device. Owing to its over-dead-point configuration, in the disengaged condition of the clutch device the compensation spring holds the arrangement in a stable condition in which one gearwheel segment stop is in contact with the associated stop of the housing. The possibility of providing two actuating devices in association with a dual clutch device in order to actuate two clutch assembles independently of one another, is mentioned.

Various designs for spindle-type actuating devices for dual clutches are known from DE 102 38 118 A1, EP 1 400 716 A1, DE 10 2004 001 569 A1, DE 103 13 450 A1 and DE 103 48 312 A1. DE 198 51 466 A1 discloses a control element with a gearwheel segment that can be turned by an actuator, upon which a supporting spring acts to assist the actuator. The special feature of the design proposed is that the pre-stressed condition of the supporting spring can be optionally varied.

NO-type dual clutches are known, in which actuation takes place by means of an electric motor driven disengagement lever, with actuation of the respective clutch by a ramp or rocker mechanism. The clutch device and the actuating device are separate assembles apart from one another.

A problem with the systems practiced until now is that additional components are needed in order to compensate for assembly tolerances, which makes the structure more expensive and complicated, and hence more susceptible to malfunctions.

For NO clutches self-locking actuating mechanisms (whose efficiency is poor) or additional locking elements (with corresponding costs) have been proposed. To produce a permanent pre-load on an actuating element or a disengagement bearing of an actuating element that serves as a release element or an engagement bearing of an actuating element that serves as an engagement element, in accordance with conventional systems additional springs are needed.

A further drawback of conventional systems is that for clutches or possibly dual clutches of the NO type and clutches or possibly dual clutches of the NC type, as the case may be, actuating devices of respectively different kinds are provided so that accordingly, they have to be designed in detail, adapted and stocked by any manufacturer who supplies clutches of both types.

SUMMARY OF THE INVENTION

Among other things a purpose of the present invention is to achieve an improvement at least in relation to one of the standpoints discussed.

A further purpose of the invention is to find a solution, in relation to the supporting element, the actuating element and if necessary the rotary member, which is simple and inexpensive to produce and/or which reduces the radial fitting space taken up by these components.

Specific, mutually independent objectives of the invention are also: easy adjustability of a pre-load on a disengagement or engagement bearing, easy adjustability of an over-dead-point angle for a compensation spring, the provision of expedient rotation displacement range limiting means or axial displacement range limiting means for the actuating element or the rotary member, and a reduction of the total structural space taken up. Other objectives emerge from the proposed general and further concretized solutions.

According to a first aspect, the invention provides a torque transmission device for torque transmission in a drivetrain of a motor vehicle between a drive unit and a transmission, which comprises:

a friction clutch device comprising at least one friction clutch assembly that can be optionally actuated to engage it or disengage it;

an actuating device for applying actuation forces, in particular engagement or disengagement forces to the friction clutch device, in order to actuate at least one friction clutch assembly of the friction clutch device in the engagement or disengagement direction, such that the actuating device comprises:

at least one axially displaceable actuating element associated with the, or with a friction clutch assembly, and at least one essentially axially fixed supporting element associated with the actuating element, such that to actuate its associated friction clutch assembly, by virtue of rotational movement imparted to a rotary member of the actuating device the actuating element can be displaced in an axial translation movement and/or axial forces can be exerted on the actuating element via rotational forces exerted on the rotary member, such that the actuating element or the supporting element serves as the rotary member or a rotary member separate from the actuating element and the supporting element but which co-operates with them is provided;

at least one actuator associated with the rotary member and the friction clutch assembly, by means of which first rotational forces can be exerted on the rotary member in order to actuate the friction clutch assembly;

at least one compensation spring which is articulated on one side to the rotary member and on the other side to an arm of part of the actuating device, in such manner that second rotational forces produced by stressing the compensation spring can be exerted on the rotary member.

According to the invention, it is proposed that:

a) the friction clutch assembly is of the Normally Open (NO) type and, by virtue of the stressing of the compensation spring, a second rotational force can be exerted on the rotary member such that an actuating force, produced without the action of a first rotational force, is applied in the friction clutch device by means of the actuating element and holds the friction clutch in the engaged condition (NC), or b) the friction clutch assembly is of the Normally Closed type (NC) and, by virtue of the stressing of the compensation spring, a second rotational force can be exerted on the rotary member such that an actuating force, produced without the actuation of a first rotational force, is applied in the friction clutch device by means of the actuating element and holds the friction clutch in the disengaged condition (NO).

According to the proposal of the invention it is in principal possible to actuate a friction clutch device of the normally-open type and a friction clutch device of the normally-closed type by means of an actuating device of identical structure or, if needs be, even a structurally similar actuating device. The system as a whole, i.e. the torque transmission device, is changed by virtue of overcompensation from an NO to an NC system or from an NC system to an NO system. Due to the overcompensation by the at least one compensation spring there is no need for a self-locking transmission and also no need for an additional locking mechanism in order to relieve the actuator of the actuating device. The at least one friction clutch assembly of the friction clutch device can be of the wet- or moist-operating type or even of the dry-operating type, regardless of whether an overcompensation from NO to NC or from NC to NO is provided for.

In relation to other aspects of the invention the further development proposals discussed below are at the same time also proposals of the invention which relate in general to the torque transmission device mentioned at the start, in which the actuating device does not necessarily also comprise at least one compensation spring. Various further development proposals, however, also relate to the torque transmission device mentioned at the start, in which the actuating device comprises at least one compensation spring which is articulated on one side to the rotary member and on the other side to an arm of part of the actuating device, in such manner that second rotational forces produced by stressing the compensation spring can be exerted on the rotary member.

As a further development it is proposed that the compensation spring is articulated on one side to the rotary member and on the other side to the arm in such manner that in a first rotation position range of the rotary member the second rotational forces act on the rotary member in a first rotational direction and in a second rotation position range of the rotary member they act upon it in a second rotational direction. Thus, an over-dead-point configuration can be provided for the compensation spring.

According to a preferred design it is provided that the first rotation position range comprises an engagement rotation position of the rotary member, in which the associated friction clutch assembly is engaged, and the second rotation position range comprises a disengagement rotation position of the rotary member, in which the associated friction clutch assembly is disengaged, and in the first rotation position range the second rotational force acts in the direction toward the engagement rotation position and in the second rotation position range the second rotational force acts in the direction toward the disengagement rotation position. In particular, the compensation spring can always act in the direction toward one respective end rotation angle or end-stop corresponding to the conditions "fully engaged" and "fully disengaged". Thus, in particular, it can also be arranged that the friction clutch device remains in these two conditions without rotational forces having to be exerted by the actuator on the rotary member. The actuator then serves, therefore, only to change the friction clutch assembly from the disengaged to the engaged condition or from the disengaged condition to the engaged condition or, if needs be, to a desired intermediate condition.

The invention relates especially to the design of the friction clutch device as a single friction clutch device comprising just one friction clutch assembly, with which are associated at least one actuating element and at least one actuator (as a rule, just one actuating element and just one actuator) of the actuating device, and if necessary at least one compensation spring (usually just one compensation spring) of the actuating device. The invention provides a corresponding torque transmission device.

Furthermore, the invention relates especially to a friction clutch device made as a dual or as a multiple friction clutch device, which comprises a first friction clutch assembly with which is associated at least one (and as a rule just one) first actuating element of the actuating device, and which comprises also a second friction clutch assembly with which is associated at least one (and as a rule just one) second actuating element of the actuating device. The invention provides a corresponding torque transmission device.

Above all, the idea is that the first friction clutch is associated with at least one (and preferably just one) first actuator and at least one (and preferably just one) first compensation spring of the actuating device, and the second friction clutch device is associated with at least one (and preferably just one) second actuator and at least one (and preferably just one) second compensation spring of the actuating device.

Moreover, above all the idea is that the first actuating element on the one hand, and the second actuating element on the other hand, can be axially displaced independently of one another, and/or the first rotary member on the one hand, and the second rotary member on the other hand, can be rotated independently of one another, and/or the first friction clutch assembly on the one hand, and the second friction clutch assembly on the other hand, can be engaged and disengaged independently of one another.

Preferably, the actuating element associated with the friction clutch assembly, or with the friction clutch assembly concerned—or alternatively, the supporting element associated therewith—serves as the rotary member. It is particularly expedient if an actuating element mounted to rotate relative to the preferably stationary supporting element serves as the rotary member. For this purpose, as a further development it is proposed that the supporting element is fixed to the body and/or to a stator of the actuator associated with the friction clutch assembly or an actuator holder that holds the actuator, possibly being part of the body, or that it is made integrally therewith or with the body.

However, it may also be entirely expedient for the supporting element mounted to rotate relative to the actuating element to serve as the rotary member. In this case, as a further development it is proposed that the supporting element is connected by a rotary bearing arrangement, axially fixed to the body and/or to a stator of the actuator holder that holds the actuator, and is possibly part of the body.

Advantageously, the rotary member or the respective rotary member can be made with gearteeth or with first and second gearteeth, which are or can be brought directly or indirectly into rotary drive connection with a drive output of the associated actuator or of the associated first or second actuator. The gearteeth can expediently be provided on a gearwheel segment or on a first or second gearwheel segment. In this connection, the idea is above all that the actuator is arranged radially displaced relative to an axis of the rotary member, and that it comprises, for example, a pinion or a worm gear that meshes with outer gearteeth of the gearwheel segment.

It is conceivable for the gearteeth or gearwheel segment to be an integral or one-piece part of the rotary member, or at least connected fixed thereto.

Another possibility, worthy of independent protection, is that the gearteeth or gearwheel segment are formed on a rotary component separate from but arranged on the rotary member, such that the rotary component, in a first relative position, is uncoupled from the rotary member to allow rotation of the latter which is independent of the rotary component, while in a second relative position the rotary component is coupled to the rotary member so that they rotate together. As a further development it is proposed that the mutually engaging formations on the rotary component and the rotary member can be brought into rotation-driving engagement by an axial movement of the rotary component relative to the rotary member, from the first to the second relative position.

By means of the separate rotary component it is possible, for example, independently of the setting of a pre-load on the disengagement or engagement bearing, to adjust an over-dead-point angle for a compensation spring and also to support the automatic pre-load adjustment by means of a pre-load spring which pushes the actuating element or bearing, in the case of a clutch of the NC type into the engaged condition with an axial nominal force corresponding to the nominal pre-load on the disengagement bearing, or in the case of a clutch of the NO type into the disengaged condition with a nominal force corresponding to the nominal pre-load on the engagement bearing, in opposition to force application elements of the clutch, for example diaphragm spring blades. In a rotation position of the rotary member that corresponds to this axial position of the actuating element, the gearwheel segment can then be coupled to the rotary member in the coupling position by displacing the rotary component.

In connection with the rotary component the idea is that the compensation spring associated with the rotary member is articulated to the rotary component and thus, via the rotary component, to the rotary member only in the second relative position. As a further development it is proposed that axial adjustment forces can be exerted on the rotary component by the compensation spring, in order to move the rotary component from the first to the second relative position.

In a particularly advantageous embodiment a feature of the torque transmission device is that it comprises at least one pre-stressing spring that exerts pre-stressing forces on the, or on at least one actuating element or on an actuating bearing, in particular a disengagement bearing or engagement bearing of the actuating element, by virtue of which a defined pre-stress force can be set on the, or on an actuating bearing, in particular disengagement or engagement bearing of the actuating element, in the case of a compensation spring preferably at least in an adjustment operating mode independently of any direct or indirect action of the compensation spring upon the actuating element. In this case the pre-stressing spring can act between the body or supporting element on one side and the actuating element on the other side.

Another, very advantageous possibility is that the actuating element comprises a first part-element which can be displaced by the rotational movement imparted to the rotary member in an axial translation movement, and a second part-element comprising the actuating bearing, between which there acts a wear compensation mechanism by means of which a relative axial position of the part-elements can be adjusted. The design of the actuating element with a wear compensation mechanism is of general interest and is worthy of independent protection. It can then be expediently provided that the pre-stressing spring belongs to the wear compensation mechanism and in that case, in a first operating condition the pre-stressing spring locks a momentary relative axial position of the part-elements and, in a second operating condition, which in the case of a compensation spring preferably corresponds to the adjustment operation mode, by virtue of the pre-stressing spring a defined pre-stressing force can be applied to the actuating bearing, in particular the disengagement or engagement bearing, of the actuating element.

Advantageously, the pre-stressing spring can act between a sleeve component belonging to the second part-element and a ball cage comprising locking balls, which surrounds a coupling section of the first part-element that tapers in an axial direction.

As a further development it is proposed that when the actuating element is moved in a specified axial direction through an axial distance that exceeds a specified or specifiable amount, the ball cage comes up against a release stop and, if the actuating element is moved axially farther in the specified axial direction, it is impeded by an axial entraining movement that corresponds to a relative movement of the ball cage in the tapering direction of the coupling section, to release the momentary axial position of the part-elements and to set a new momentary axial position of the part-elements with the collaboration of the pre-stressing spring.

In general it can be provided that the rotary drive connection between the gearteeth or gearwheel segment and the drive output of the actuator comprises at least one pair of gearteeth sets which allows a relative axial adjustment.

According to another design feature which is also worthy of protection in its own right, it is provided that a relative rotation position between at least one part of the body and at least one additional component that can be fixed thereto can be adjusted, of which the additional component limits a rotation displacement range of the, or the respective rotary component by means of at least one stop, at least on one side, and/or holds the, or the respective actuator, and/or has an articulation point for the, or the respective compensation spring and, by virtue of the supporting element arranged rotationally fixed on it, the body part concerned defines an axial position of the actuating element that corresponds to an abutment rotation position of the rotary member. In this way, for example, on the one hand the pre-load on the disengagement or engagement bearing and, on the other hand, the position of the actuator and hence its drive input element (possibly in the form of a pinion) or the articulation point in the angular direction can be adjusted in one operation.

Advantageously, connection means that act between the body part and the additional component and can preferably be used for rotation control can be provided for fixing a set nominal rotation position. For example, it is conceivable that of the body portion and the additional component, at least one has at least one slot extending in a rotational direction and at least the other has at least one bolt that engages in the slot.

According to another design which is particularly worthy of protection in its own right, it is provided that a stator and a rotor of the actuator or of the actuator concerned are arranged axially with the rotary member and/or coaxially with the actuating element and the supporting element. For example, it can be provided that the stator of the actuator is arranged coaxially with a holding sleeve of a body of the actuating device and is preferably held by this at the inner periphery or outer periphery. Expediently, the holding sleeve can form the supporting element or can hold it.

This coaxial integration of the actuator with the actuating-element/supporting-element assembly saves radial fitting space and, because of its compactness, the resulting actuation module can be handled particularly easily. With regard to the usual actuator dimensions, the axial fitting space too is not increased but rather, tends to be reduced.

As a further development it is proposed that the actuator comprises a rotor with gearteeth, which is coupled via at least one intermediate gear to gearteeth of the rotary member, preferably to a gearwheel segment of the rotary member. Another possibility is that the actuator has a rotor which is directly connected to or coupled with the rotary member, preferably by the mutual engagement of teeth on the rotor and teeth on the rotary member, if desired a gearwheel segment of the rotary member. These further development proposals can also be considered in the case of a non-coaxial arrangement of the actuator relative to the rotary member or actuating element and supporting element.

Advantageously, it can be provided that at least one of the active gearteeth pairings enables a relative axial displacement of the components coupled or connected to one another.

In particular it is conceivable that the actuator is designed as an external rotor. The teeth of the rotor can expediently be external teeth.

Regardless of the type and design of the actuator, the supporting element and the actuating element can be in the form of a spindle/threaded nut arrangement, preferably a ball spindle/ball threaded nut arrangement, or can contain one. For this, as a further development it is proposed that a sleeve-like spindle with an external thread, possibly an external ball thread, and an internal thread or internal ball thread, is associated as the common supporting element with a first and a second friction clutch assembly, and an external threaded nut or external ball-threaded nut that co-operates with the external thread or external ball thread, and an internal threaded nut or internal ball-threaded nut that co-operates with the internal thread or internal ball thread, serve respectively as the first actuating element associated with the first friction clutch assembly and the second actuating element associated with the second friction clutch assembly.

According to a design of a different type compared with the above and one that is also particularly worthy of protection in its own right, it is provided that the supporting element and the actuating element form or comprise a ball cage/threaded nut arrangement, in which balls held in defined positions by a ball cage engage in an internal or external thread of a threaded nut, which is guided axially and radially and in a relative rotational direction by means of the ball cage and the balls.

Such a ball cage/threaded nut arrangement is simple to produce, especially when one supporting element and two actuating elements that can move independently of one another and that co-operate with the supporting element are provided. In particular, a sleeve-like supporting element forming the ball cage, with an outer sleeve-like actuating element and an inner sleeve-like actuating element can be provided. The supporting element or supporting sleeve can have openings distributed around its periphery to receive or hold the balls, such that for the balls sliding friction on the sides of the supporting element and rolling friction on the sides of the actuating element, or the actuating element concerned, can take place. This can also be achieved for the design of the actuating device for actuating a dual clutch, in that a first set of balls are inserted from the inside and a second set of balls from the outside into the openings, whose diameter is smaller than that of the balls so that, as it were, two separate ball layers are produced.

Compared with such specific design possibilities, it is proposed in a more general way that a sleeve-like ball cage is associated as a common supporting element with a first and a second friction clutch assembly, and that an outer threaded nut that co-operates at least with some of the balls held by the ball cage, and an inner threaded nut that co-operates with some of the balls held by the ball cage, serve as the first actuating element associated with the first friction clutch assembly and as the second actuating element associated with the second friction clutch assembly. In such a case it can expediently be provided that the outer threaded nut co-operates with an outer number of balls, namely with balls held on the outside of the ball cage, while the inner threaded nut co-operates with an inner number of balls, namely with balls held on the inside of the ball cage.

In general, it is proposed that at least one stop-spring is provided, which limits a rotational movement range of the rotary member and/or an axial displacement range of the actuating element, on one or both sides, or which co-operates with this limiting action. In this connection it can be provided that at least one abutment of the rotary member or its gearwheel segment can be rotated in one or both rotational directions against a stop-spring supported, or which can be supported, on a stationary stop.

Another possibility is that the rotary member or its gearwheel segment is or can be coupled by means of a stop-spring to a rotary component that can rotate coaxially with the rotary member and rotates together with it, the rotary component being able to rotate in one or both directions against a stationary stop. In this case it can be provided that the stop-spring engages both in a spring aperture of the rotary member or its gearwheel segment and in a spring aperture of the rotary component.

From a standpoint independent of the designs discussed above, it is also proposed in a general way that the friction clutch device has an input side that is or can be coupled to the drive output of the drive unit, and at least one output side of the friction clutch assembly that is or can be coupled to an input element, such as a transmission input shaft, of the transmission, if applicable a first output side associated with the first friction clutch assembly and a second output side associated with the second friction clutch assembly, such that the input side is or can be connected via a supporting rotary bearing arrangement to the body and/or to the supporting element and/or to a stator of the actuator associated with the friction clutch assembly or to an actuator holder that holds the actuator, to create an axial support relationship.

In addition, it is proposed in general terms that the torque transmission device is or can be pre-assembled to form an installable structural unit comprising the friction clutch assembly and the actuating device, such that the installable structural unit can be installed as a unit without the need for an at least partial, re-disassembly between a drive unit and a transmission in a drivetrain.

In addition, in general terms it is proposed that the, or each respective actuating element is made with a rotary bearing that serves as a disengagement or engagement bearing, with which the actuating element acts upon at least one force-application element of the associated friction clutch assembly that rotates together with the/an input side of the friction clutch device.

As regards the pre-assembled installable structural unit the idea is that this fulfills at least one, preferably at least two and, best of all, every one of the following conditions:
  a) in the pre-assembled installable structural unit a defined pre-load acting upon the engagement or disengagement bearing of the associated actuating element is set, which is based on a second rotational force exerted on the rotary member or the respective rotary member concerned, and/or on a force exerted by the force-application element, and/or on an axial force of at least one pre-stressing spring;
  b) in the pre-assembled installable structural unit, in relation to the compensation spring or compensation springs a defined over-dead-point configuration is set;
  c) in the pre-assembled installable structural unit the actuating element or the respective actuating element concerned is located in a defined axial position for compensating an axial position tolerance of the force-application element of the associated friction clutch assembly relative to the input side and to the body.

Furthermore, according to another, independent aspect the invention provides an actuation device for the application of actuating forces, in particular engagement or disengagement forces, to a friction clutch device in order to actuate at least one friction clutch assembly of the friction clutch device in the engagement or disengagement direction, the actuating device comprising:
  at least one axially displaceable actuating element associated with the, or with a friction clutch assembly, and at least one axially fixed supporting element associated with the actuating element, such that to actuate the associated friction clutch assembly the actuating element can be displaced in an axial translation movement by virtue of rotational movement imparted to a rotary member of the actuating device, and/or axial forces can be exerted on the actuating element by virtue of rotational forces exerted on the rotary member, the rotary member being provided with gearteeth, preferably on a gearwheel segment, which is or can be brought into direct or indirect rotary drive connection with a drive output of an associated actuator.

According to the invention, it is provided that a rotary component separate from but arranged on the rotary member comprises the gearteeth, such that in a first relative position the rotary component is decoupled from the rotary member to allow rotation of the rotary member independently of the rotary component, while in a second relative position it is coupled to the rotary member so that they rotate together. In this way it is simple to produce a defined actuation configuration for the actuating element, such as in relation to a rotational movement range and/or in relation to the over-dead-point angle of a compensation spring. Furthermore, in this way a defined pre-load can be set in a simple manner in relation to a disengagement bearing or engagement bearing of the actuating element.

As a further development it is proposed that carrier formations of the rotary component and the rotary member can be brought into rotation-driving engagement by an axial movement of the rotary component relative to the rotary member, from the first to the second relative position.

The possibility has already been mentioned that a compensation spring can be provided, in this context thinking above all of a compensation spring associated with the rotary member. In this connection it is proposed in particular that a compensation spring associated with the rotary member is articulated to the rotary component and therefore only in the second relative position to the rotary member via the rotary component. Advantageously, the compensation spring can exert axial positioning forces on the rotary component to move the latter from the first to the second relative position.

The actuating device proposed according to the invention can advantageously be characterized by at least one axial pre-stressing spring that exerts pre-stressing forces on the, or on the at least one actuating element or on an actuating bearing, in particular a disengagement or an engagement bearing of the actuating element, by virtue of which a defined pre-stressing force can be set on the, or on an actuating bearing, in particular a disengagement or engagement bearing of the actuating element, in the case of a compensation spring preferably at least in an adjustment operating mode independently of any direct or indirect action of the compensation spring on the actuating element. In this case the pre-stressing spring can act between the body or supporting element on one side and the actuating element on the other side. This, however, does not necessarily have to be so.

Advantageously, the actuating element can be of multi-component design, equipped with a wear compensation mechanism. For this it is proposed that the actuating element comprises a first part-element that can be displaced in an axial translation movement by virtue of the rotational movement imparted to the rotary member, and a second part-element comprising the actuating bearing, between which there acts a wear compensation mechanism by means of which a relative axial position of the part-elements can be adjusted. This proposed further development is also of fundamental interest, and merits protection in its own right.

Correspondingly, according to a further aspect the invention provides an actuating device for applying actuation forces, in particular engagement or disengagement forces, to a friction clutch device in order to actuate at least one friction clutch assembly of the friction clutch device in the engagement or disengagement direction, such that the actuating device comprises:

at least one actuating element associated with the, or with a friction clutch assembly and at least one substantially axially fixed supporting element associated with the actuating element, such that to actuate its associated friction clutch assembly the actuating element can be displaced in an axial translation movement by virtue of rotational movement imparted to a rotary member of the actuating device, and/or such that axial forces can be exerted on the actuating element by virtue of rotational forces exerted on the rotary member.

According to the invention, it is provided that the actuating element comprises a first part-element which can be displaced in the axial translation movement by virtue of the rotational movement imparted to the rotary member, and a second part-element comprising the actuating bearing, between which there acts a wear compensation mechanism by means of which the relative axial position of the part-elements can be adjusted.

According to the proposal of the invention, there is no need for a wear compensation mechanism integrated in the clutch itself, and this is advantageous in some cases. A particular advantage can be achieved if the wear compensation mechanism at the same time enables the pre-load on the disengagement or engagement bearing to be adjusted easily.

Both in relation to the further development proposal and also in relation to the independent proposals of the invention, as a further development it is also proposed that a, or the pre-stressing spring should be part of the wear compensation mechanism, so that in a first operating condition the pre-stressing spring locks a momentary relative axial position of the part-elements, and by virtue of the pre-stressing spring, in a second operating condition which in the case of a compensation spring preferably corresponds to the adjustment operating mode, a defined pre-stressing force can be set on the actuating bearing, in particular the disengagement or engagement bearing, of the actuating element.

As regards the detailed design of the wear compensation mechanism, there are many possibilities. According to one expedient design the pre-stressing spring acts between a sleeve component which is part of the second part-element and a ball cage comprising locking balls, which surrounds a coupling section of the first part-element that tapers in an axial direction.

As a further development it is proposed that if the actuating element moves axially through a distance that exceeds a specified or specifiable amount in a specified axial direction, the ball cage encounters a release abutment and if the actuating element moves any farther in the axial direction the cage is prevented from moving axially along with it, corresponding to a relative movement of the ball cage in the tapering direction of the coupling section, to release the momentary axial position of the part-elements and establish a new momentary axial position thereof by a conjoint action of the pre-stressing spring.

According to another, independent aspect the invention also provides an actuating device for applying actuating forces, in particular engagement or disengagement forces, in a friction clutch device in order to actuate at least one friction clutch assembly of the friction clutch device in the engagement or disengagement direction, such that the actuating device comprises:

at least one axially displaceable actuating element associated with the, or with a friction clutch assembly, and at least one substantially axially fixed supporting element associated with the actuating element, such that to actuate the associated friction clutch assembly the actuating element can be displaced in an axial translation movement by virtue of rotational movement imparted to a rotary member of the actuating device, and/or such that axial forces can be exerted on the actuating element by virtue of rotational forces exerted on the rotary member.

According to the invention, it is provided that a relative rotation position between at least one part of the body and at least one added component that can be attached thereto can be set, of which the added component limits a rotational movement range of the, or of the respective rotary element concerned by means of at least one stop on at least one side, and/or holds the, or the respective actuator and/or has an articulation point for the, or the respective compensation spring, and the body part, by means of the supporting element arranged rotationally fixed on it, defines an axial position of the actuating element that corresponds to an abutment rotation position of the rotating member. Thus, for example, on the one hand the pre-stress on the disengagement or engagement bearing and on the other hand the rotation angle position of the actuator or the articulation point for the compensation spring can be adjusted in one operation. To fix an adjusted nominal rotation position, connecting means that act between the body portion and the added component can be provided, which can preferably also be used to guide the rotation. Expediently, it can be provided that of the body portion and the added component, at least one has at least one slot extending in a rotational direction, and at least the other has at least one bolt that engages in the slot.

According to another aspect the invention provides an actuating device for applying actuation forces, in particular engagement or disengagement forces, in a friction clutch device in order to actuate at least one friction clutch assembly of the friction clutch device in the engagement or disengagement direction, such that the actuating device comprises:

at least one axially displaceable actuating element associated with the, or with a friction clutch assembly and at least one substantially axially fixed supporting element associated with the actuating element, such that to actuate its associated friction clutch assembly the actuating element can be displaced in an axial translation movement by virtue of rotational movement imparted to a rotary member of the actuating device, and/or axial forces can be exerted on the actuating element by virtue of rotational forces exerted on the rotary member, with the actuating element or the supporting element serving as the rotary member.

According to the invention it is provided that the supporting element and the actuating element form, or comprise, a ball cage/ball nut arrangement, in which balls held in defined positions by a ball cage engage in an inner thread or outer thread of a threaded nut guided axially, radially and in the relative rotational direction by means of the ball cage and the balls.

Concerning the advantages so achieved and the possible designs, reference is made to the embodiments described above in connection with a correspondingly designed torque transmission device. Thus, a sleeve-like ball cage can be associated with a first and a second friction clutch assembly as a common supporting element. In this connection it is proposed in particular that an outer threaded nut that co-operates at least with some of the balls held by the ball cage, and an inner threaded nut that co-operates at least with some of the balls held by the ball cage, serve respectively as the first actuating element associated with the first friction clutch assembly and as the second actuating element associated with the second friction clutch assembly. In this case it can advantageously be provided that the outer threaded nut co-operates with an outer number of balls, namely with the balls held on the outside of the ball cage, and the inner threaded nut co-operates with an inner number of balls, namely those held on the inside of the ball cage.

According to a further aspect, the invention provides an actuating device for the application of actuating forces, in particular engagement or disengagement forces, in a friction clutch device in order to actuate at least one friction clutch assembly of the friction clutch device in the engagement or disengagement direction, such that the actuating element comprises:

at least one axially displaceable actuating element associated with the, or with a friction clutch assembly and at least one substantially axially fixed supporting element, such that to actuate its associated friction clutch assembly, by virtue of rotational movement imparted to a rotary member of the actuating device the actuating element can be displaced in an axial translation movement and/or, by virtue of rotational forces exerted on the rotary member, axial forces can be exerted on the actuating element, such that the actuating element or the supporting element serves as the rotary member, or a rotary member separate from the actuating element and the supporting element but which co-operates with them is provided.

According to the invention, it is provided that a stator and a rotor of the actuator or of the respective actuator concerned are arranged coaxially with the rotary member and/or coaxially with the actuating element and the supporting element.

Concerning the advantages that can be achieved and the design features that can be considered, reference is made to the descriptions given above in connection with a correspondingly configured torque transmission device. Thus, the stator of the actuator can be arranged coaxially with a holding sleeve of a body of the actuating device and is preferably held by the holding sleeve on its inside circumference or its outside circumference. Expediently, the holding sleeve can form the supporting element or can contain it.

It can be provided that the actuator comprises a rotor with gearteeth, which is coupled via at least one intermediate gearwheel to gearteeth of the rotary member, preferably a gearwheel segment of the rotary member. Furthermore, it can be provided that the actuator has a rotor that can be connected or coupled directly to the rotary member, preferably by mutual engagement between gearteeth on the rotor and gearteeth on the rotary member, preferably a gearwheel segment of the rotary member.

Advantageously, it can be provided that at least one of the active gearteeth parings enables a relative axial displacement of the components coupled or connected to one another.

Advantageously, the actuator can be made as an external rotor. The teeth of the rotor can be external teeth.

As regards the actuating device according to the invention, in accordance with the aspects described it is pointed out that these can be designed to correspond with the actuating device of the torque transmission device according to the invention.

According to a further aspect, the invention provides a method for assembling a torque transmission device for the transmission of torque in a drivetrain of a motor vehicle between a drive unit and a transmission, to produce a structural unit. The torque transmission device to which the assembly method relates comprises:

a friction clutch device comprising at least one friction clutch assembly that can be actuated optionally to engage or disengage it;

an actuating device for applying actuating forces, in particular engagement or disengagement force in the friction clutch device in order to actuate at least one friction clutch assembly of the friction clutch device in the engagement or disengagement direction, such that the actuating device comprises:

at least one axially displaceable actuating element associated with the, or with a friction clutch assembly, and at least one substantially axially fixed supporting element associated with the actuating element, such that to actuate its associated friction clutch assembly, by virtue of rotational movement imparted to a rotary member of the actuating device the actuating element can be displaced in an axial translation movement, and/or by virtue of rotational forces exerted on the rotary member axial forces can be exerted on the actuating element, such that the actuating element or the supporting element serves as the rotary member or a rotary member separate from the actuating element and the supporting element, which co-operates with them, is provided;

at least one actuator associated with the rotary member and the friction clutch assembly, by means of which first rotational forces can be exerted on the rotary member in order to actuate the friction assembly;

preferably, at least one compensation spring, articulated on one side to the rotary member and on the other side to an arm of a body of the actuating device in such manner that second rotational forces can be exerted on the rotary member by virtue of the stressing of the compensation spring.

According to the invention, the method comprises the following steps:

A) producing the friction clutch device and the actuating device as separate, at least partially pre-assembled structural units;

B) connection of an input side of the clutch device that can be coupled to a drive output of the drive unit by means of a supporting rotary bearing arrangement to the body and/or the supporting element and/or to a stator of the actuator associated with the friction clutch assembly or to an actuator holder holding it, to produce an axial support relationship;

C) by rotating the rotary member or rotary members, fitting the actuating element or the actuating elements to at least one force application element of the associated friction clutch assembly that rotates with the input side of the friction clutch device, i) to set a defined pre-load that acts upon a disengagement or engagement bearing of the actuating element, which is based on a second rotational force of the compensation spring or springs exerted on the rotary member or on the respective rotary member concerned, and/or on a force exerted on the rotary member or the respective rotary member or on the actuating element or the respective actuating element concerned by at least one pre-stressing spring, and/or on a force exerted by the force application element, and/or ii) to compensate an axial position tolerance of the force application element of the associated friction clutch assembly relative to the input side.

In the case of a compensation spring the method can also comprise the following step:

D) setting of i) a defined over-dead-point configuration for the compensation spring or springs, and ii) an axial movement range of the actuating element or of a respective axial movement range of the actuating elements, by adjusting at least one movement stop that limits the axial movement range directly or indirectly on at least one side.

According to the invention's proposal, production tolerances, for example in relation to the position of diaphragm spring blade ends or suchlike in the engaged or disengaged condition can be compensated, since during the fitting of the actuating device onto the friction clutch device the actuating element, or each actuating element in the case of a dual clutch, can be adjusted appropriately so that, expediently, a minimum pre-load on the disengagement bearing or engagement bearing is set and can if desired be stored in the system. Thus for example, a spindle release or spindle engagement element can be connected fixed by means of a support bearing or in general a supporting rotary bearing arrangement to the clutch device, and in the case of an actuating element design comprising a gearwheel segment, this can be rotated until the disengagement or the engagement bearing contacts the force application element (such as the diaphragm spring blade or blades). To set a defined pre-load, the rotation position that produces the contact between the bearing and the force application element can be rotated farther until the desired pre-load has been reached, whereupon at least one stop for the gearwheel segment is set or fixed. Depending on the design, an articulation point for the compensation spring can be rotated and thus adjusted conjointly, to produce a defined compensation spring characteristic and if necessary a defined over-dead-point characteristic. In this way, for example, a resultant compensation spring characteristic can be matched to a disengagement characteristic or engagement characteristic. To maintain such a match, the clutch device or the clutch assembly concerned can be provided with an integrated wear compensation device. Alternatively, the actuating device and in particular the actuating element associated with the clutch assembly can also be equipped with a wear compensation device.

In the context of the design options of the method discussed and the torque transmission device on which it is based, other possibilities can also be considered. In general terms it is proposed that in step C) a defined torque is exerted on the rotary member so that the actuating element contacts the force application element in a defined manner. Then, the pre-load can be based on a force exerted by the force application element and adjusted by adjusting, in particular positioning and if necessary fixing an axial end-stop for the actuating element or a rotation end-stop for the rotary member.

Above all the idea is that the axial end-stop or rotation end-stop corresponds to a disengaged condition of the friction clutch assembly in the case of a friction clutch assembly of the normally-open (NO) type, and to an engaged condition in the case of a friction clutch assembly of the normally-closed (NC) type. As a further development it is proposed that a further axial end-stop for the actuating element or a further rotation end-stop for the rotary member is set, in particular positioned and if necessary fixed, such that in the case of a friction clutch assembly of the normally-open (NO) type the further axial end-stop or the further rotation end-stop corresponds to an engaged condition of the friction clutch assembly, and in the case of a friction clutch assembly of the normally-closed (NC) type to a disengaged condition of the friction clutch assembly.

Particularly expediently, it can be provided that the axial rotation end-stop and the further rotation end-stop are set in one operation by setting and fixing a relative nominal rotation position between the rotary member in a rotation position that corresponds to a defined axial position of the actuating element, on the one hand, and the body or an associated body portion including the rotation end-stops on the other hand. This correspondingly reduces the assembly and adjustment effort.

A particularly advantageous feature of the method is provided by setting a relative rotation position between at least one body portion and at least one additional component that can be fixed thereto, of which the additional component limits on at least one side a rotation displacement range of the, or of the respective rotary component by means of at least one stop, and/or holds the, or the respective actuator, and/or has an articulation point for the, or the respective compensation spring, and the body portion defines by virtue of the supporting element rotationally fixed on it an axial position of the actuating element that corresponds to an end-stop rotation position of the rotary member. In a simple manner, this for example enables on the one hand a pre-load on the disengagement or engagement bearing, and on the other hand a rotation angle position of the actuator or the articulation point, to be adjusted in one operation. Expediently, a set nominal rotation position can be fixed by connection means that act between the body portion and the additional component, preferably also using the appropriately designed connections means as a rotation guide. An idea for this, for example, is that of the body portion and the additional component at least one has at least one slot extending in a rotational direction, and at least the other has at least one bolt, which can be brought into mutual engagement and fixed.

It should not be excluded that the over-dead-point configuration is set on the basis of the previously carried out adjustment of the pre-load or the previously carried out compensation of the axial position tolerance by fixing an outer articulation point for the compensation spring on the arm. In such a case it can be provided that the outer articulation point is set in the condition when the actuating element abuts against the axial end-stop or against the further axial end-stop, or in the condition when the rotary member abuts against the rotation end-stop or the further rotation end-stop at a defined angular and radial position on the arm.

On the other hand, however, it is preferable for the axial end-stop or axial rotation end-stop and/or the further axial end-stop or the further rotation end-stop on the one hand, and the over-dead-point configuration on the other hand, to be set in one operation by setting and fixing a relative nominal rotation position between the rotary member in a rotation position that corresponds to a defined axial position of the actuating element, on the one hand, and the body or an associated body portion that includes the arm comprising the articulation point for the compensation spring, on the other hand. This correspondingly reduces the assembly and adjustment effort.

According to a quite different aspect, the idea is that the over-dead-point configuration is set on the basis of the previously carried out setting of the pre-load or of the previously carried out compensation of the axial position tolerance, by fixing an inner articulation point of the compensation spring on or in relation to the rotary member.

Alternatively or as a further development, an idea is to produce the over-dead-point configuration by axial displacement of a rotary component arranged on the rotary member in rotation-driving engagement with the rotary member in a defined relative rotation position between the rotary member and the rotary component. A possibility in this connection is that the compensation spring associated with the rotary member is articulated to the rotary component, such that only after establishing the rotation-driving engagement is it articulated to the rotary member via the rotary component, so that by producing the rotation-driving engagement the inner articulation point is fixed in relation to the rotary member. In this way axial adjustment forces of the compensation spring can move the component into rotation-driving engagement.

In general terms the idea is to set a rotation displacement range of the rotary member and/or an axial displacement range of the actuating element. A particularly advantageous possibility in this connection is to set the rotation displacement range by axial adjustment of a rotary component arranged on the rotary member, that can be rotated against at lest one stationary abutment into rotation-driving engagement with the rotary member.

It can be provided that a rotary drive connection between the actuator and the rotary member is formed, preferably after carrying out step C) or while carrying out step D) or after carrying out step D). In this case it can be expedient for the rotation-driving connection to be formed in the condition when the actuating element contacts the axial end-stop or the further axial end-stop, or in the condition when the rotary member contacts the rotation end-stop or the further rotation end-stop.

An alternative idea is to produce a rotary drive connection between the actuator and the rotary member before carrying out step C) or before carrying out step B), or to produce the actuating device as a structural unit with the rotary drive connection already formed between the actuator and the rotary member. The actuator can then be used as a position-setter and/or as a rotary drive for carrying out step C), if this seems appropriate.

Another very expedient possibility is to form the rotary drive connection by axial displacement of a rotary component arranged on the rotary member, which can be driven in rotation by the actuator, to bring it into rotation-driving engagement with the rotary member.

In general terms the idea is to form a rotary drive connection between the rotary member and a drive output of the actuator, such as a direct or indirect meshing or positive-interlock engagement between the drive output and the teeth (for example on a gearwheel segment) of the rotary member.

The method according to the invention can be carried out during the fitting of the torque transmission device between a drive unit and a transmission. Preferably, the body or at least one part of the body of the actuating unit is mounted on the transmission housing.

On the other hand, however, it is preferable for the torque transmission device to be assembled as a structural unit for installation, which can be fitted as a unit without need for any at least partial repeated disassembly between a drive unit and a transmission in a drivetrain.

BRIEF DESCRIPTION OF THE DRAWINGS

The invention in its various aspects is explained in greater detail with reference to embodiments presented purely as examples and illustrated in the figures, which show:

FIG. 17: Perspective side view of the actuating device in FIG. 15;

FIG. 18: Embodiment variant of the actuating device for the single clutch, shown in cross-section;

FIG. 19: Axial plan view of the actuating device in FIG. 18;

FIG. 20: Oblique perspective view of the actuating device in FIG. 18;

FIG. 24: Another example embodiment of an actuating device provided for a single clutch;

FIG. 25: Axial plan view of the actuating device in FIG. 24;

FIG. 26: Perspective side view of the actuating device in FIG. 24;

FIG. 27: Example embodiment of an actuating device for a single clutch, in which the actuating element comprises an integrated wear compensation mechanism;

FIG. 28: Axial plan view of the actuating device in FIG. 27;

FIG. 29: Perspective side view of the actuating device in FIG. 27;

FIG. 30: Example embodiment of an actuating device for a single clutch, which comprises a coaxial integrated actuator, shown in cross-section through the section line indicated in FIG. 31;

FIG. 31: Axial plan view of the actuating device in FIG. 30;

FIG. 32: Perspective side view of the actuating device in FIG. 30;

FIG. 33: A further example embodiment of an actuating device for a single clutch, which comprises a coaxial integrated actuator, shown in cross-section;

FIG. 34: Axial plan view of the actuating device in FIG. 33; and

FIG. 35: Perspective side view of the actuating device in FIG. 33.

DETAILED DESCRIPTION OF THE PREFERRED EMBODIMENTS

Figure 1:
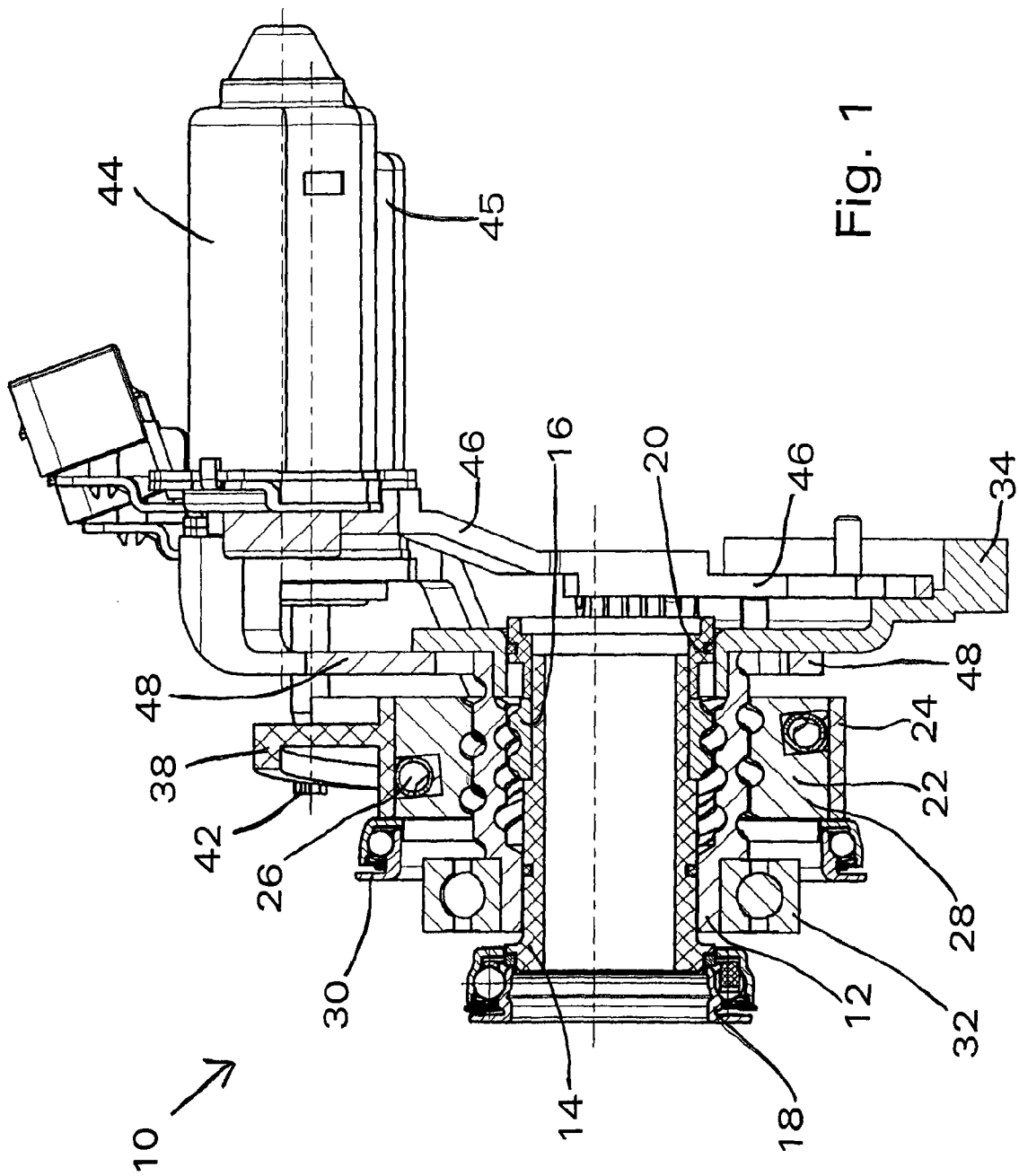
FIG. 1: Example embodiment of an actuating device for a dual clutch, viewed in transverse cross-section taken along the line I-I in FIG. 4, which can be combined with a dual clutch to form a structural unit for installation.

The first embodiment presented is an actuating device, which can also be referred to as a spindle-type actuating module, which serves to actuate a wet-operating or dry-operating dual clutch and which can be assembled with such a dual clutch to form a structural unit for installation which, without repeated disassembly, can be fitted as a structural unit between a drive unit, as a rule an internal combustion engine, and a transmission of a motor vehicle drivetrain, as a rule at least partially accommodated in a transmission housing bell of the transmission. The actuating module comprises a first actuating element associated with a first clutch assembly of the dual clutch and a second actuating element associated with a second clutch assembly of the dual clutch, which—depending on the design of the clutch assembly concerned—serve as engagement of disengagement elements. The actuating module is suitable, in particular, to be combined with a dual clutch of the NORMALLY-OPEN (NO) actuation type, in order if desired—in combination with a compensation spring arrangement—to produce an overall system of the NORMALLY-CLOSED (NC) type, or—as a rule of greater interest—to be combined with a dual clutch of the NORMALLY-CLOSED (NC) type, in order if desired—in combination with a compensation spring arrangement—to produce an overall system of the NORMALLY-OPEN (NO) type. This is achieved by at least one compensation spring associated with the respective actuating element, which over-compensates the restoring forces of the respective clutch assembly. Preferably, the at least one compensation spring associated with the first actuating element and the at least one compensation spring associated with the second actuating element are arranged in an over-dead-point configuration, so that the actuating element is held stable both in a position corresponding to an engaged condition of the respective clutch assembly and in a position corresponding to a disengaged condition thereof, without an associated actuator having to be active.

There is then no need for a self-locking transmission which keeps a respective clutch assembly in a momentarily selected actuation condition, or for an additional locking mechanism that serves the same purpose.

Below, without placing any restrictions upon generality, it is assumed that the actuating device is provided for actuating a dual clutch with two wet-operating or dry-operating clutch assemblies of the NC type, and that it is assembled, or intended for assembly with a dual clutch of that type to form a structural unit for installation. Correspondingly, the actuating module can also be referred to as a disengagement module, which comprises two actuating or disengagement elements that serve, respectively, to disengage one of the clutch assemblies of the dual clutch associated with it in each case. Advantageously—as already discussed—the compensation springs can be arranged in an over-dead-point configuration in such manner that the respective at least one compensation spring can maintain the associated clutch assembly not only in the open or disengaged condition, but also in the closed or engaged condition. An actuator, preferably of the electric motor type, which is associated with the respective actuating or disengagement element, is then needed only for moving the respective clutch assembly between the engaged and disengaged conditions or for producing and if necessary maintaining an intermediate condition.

It should be noted that for those with expert knowledge of the field, from the embodiments and embodiment variants described below appropriate actuating devices for actuating a dual clutch with two clutch assemblies of the NO type will be evident, such that by means of a compensation spring an overall system characteristic of the NC type can be realized. Concerning the actuating devices dealt with below for dual clutches with clutch assemblies of the NC type, it should also be pointed out that an overall NO characteristic can expediently be produced by overcompensation, but that this is not essential.

The structure of the actuating module according to the example embodiment represented in FIGS. 1 to 4 emerges most clearly from FIGS. 1 and 2. The actuating module 10 comprises a stationary, spindle-type supporting element 12 which is made with an inner thread and an outer thread in order to form a respective ball-guide channel or ball thread path. On the inside is arranged a sleeve-like, first actuating or disengagement element 14 which carries on the outside a spindle nut 16 with a ball thread on its outer circumference, which meshes via balls with the inner thread of the supporting element 12, so that rotational movement imparted to the first actuating element 14 is converted to an axial movement of the first actuating element 14 relative to the stationary supporting element 12. At a free end the first supporting element 12 carries a first disengagement bearing 18, which is provided in order to act upon at least one force application element, for example a plurality of diaphragm spring blade ends of the associated friction clutch assembly of the dual clutch. A dust protection cover, indexed 20, can advantageously be provided in order to protect the ball-run area from dust.

On the outside, the supporting element 12 carries a second actuating or disengagement element 22, which is formed by an outer sleeve component 24 and a body portion 28 comprising a ball return path 26. On an inner circumference the body portion 28 has a ball thread which meshes via balls with the outer ball thread of the supporting element 12, so that rotational movement imparted to the second actuating element 22 is converted into an axial movement of the second actuating element relative to the stationary supporting element 12. At a free end the second actuating element 22 carries a second disengagement bearing 30, which is provided in order to act upon at least one force application element, for example a plurality of diaphragm spring blade ends of the associated friction clutch assembly of the dual clutch.

The supporting element 12 carries a rotary bearing 32 that can be referred to as a support bearing, which serves for assembling the actuating module and the dual clutch into a structural unit for installation and to transfer axial supporting forces between the actuating module and the dual clutch, so that a closed force flow is realized for the forces transmitted via the actuating elements to the dual clutch.

The supporting element 12 is connected fixed to a body portion 34 of the actuating module, for example welded to it or held on it by a press fit, or otherwise held on it in an interlocked, material-merged or friction-locked manner. Otherwise than in the representation of FIG. 1, the supporting element 12 and the body portion 34 could also be made integrally. To enable rotational forces to be exerted on the actuating elements and thus enable the actuating elements, by virtue of their rotation, to be displaced axially relative to the supporting element, the first (inner) actuating element 14 has a first gearwheel segment 36 and the second (outer) actuating element 22 has a second gearwheel segment 38, which in the assembled condition of the module mesh respectively with a drive output pinion 40 or 42 of a first actuator 44 associated with the first actuating element 14, or of a second actuator 45 associated with the second actuating element 22. The actuators are in the form of electric motors and can if desired also be used as rotation pick-ups in order to detect a momentary rotation position of the associated actuating element.

The gearwheel segment 38 projects radially outward from the sleeve component 24 of the second actuating element 22. The gearwheel segment 36 projects radially outward from an end of the actuating element 14 which extends axially through a central opening of the body portion 34. For both clutch assemblies a disengagement path, in each case for example of around 8 mm can be provided and the thread pitch of the upper threads or ball-guides can be chosen such that this disengagement path of around 8 mm corresponds to a rotation or swivel angle of the actuating element concerned, of about 80°. The outer teeth of the gearwheel segments 36 and 38 are such as to enable an axial displacement relative to the stationary drive pinions 40 and 42.

The first actuator 44 is positioned and held by means of a first holder 46 in a defined rotation position relative to the body portion 34. For this purpose the body portion 34 has bolts 50 which pass through slots 52 in the first holder 46. The slots enable the adjustment of a relative rotation angle between the body portion 34 and the holder 46, and hence a defined position of the drive pinion 40 relative to the movement range of the gearwheel segment 36 of the first actuating element 14. During assembly, a desired relative position is fixed by screwing nuts or suchlike onto the bolts 50 and the body portion 34 is connected to the first holder 46.

For the defined positioning and holding of the second actuator 45 a second holder 48 is used, which can also be mounted in a defined rotation position on the body portion 34. For this purpose the second holder has bolts 54 which pass through slots 56 in the body portion 34 and serve for the screwing on of nuts or suchlike, so that a defined rotation position of the holder 48 relative to the body portion 34 and hence a defined position of the drive pinion 42 of the second actuator 45 relative to the movement range of the gearwheel segment 38 of the second actuating element 22 can be set and fixed, and the body portion 34 can be joined firmly to the holder 48.

Since separate respective holders are provided for the two actuators, which by virtue of the slots 52 and 56 can be adjusted relative to the body portion 34 and relative to one another within a certain angular range, the operating positions of the drive pinions 40 and 42 can be set independently of one another.

Figure 2A:
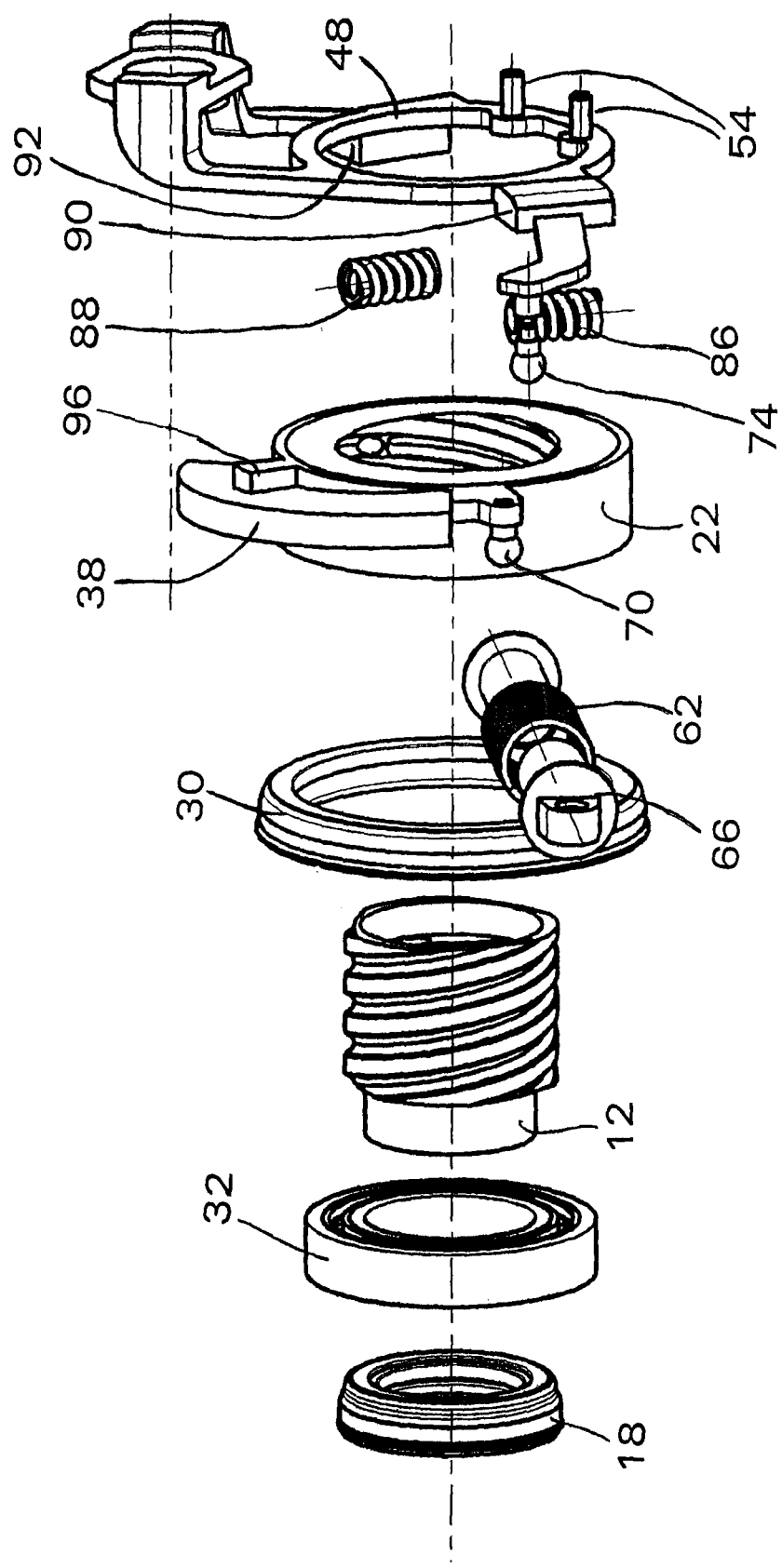
FIG. 2a: is an exploded view of a portion of the actuating device of FIG. 1.
Figure 2B:
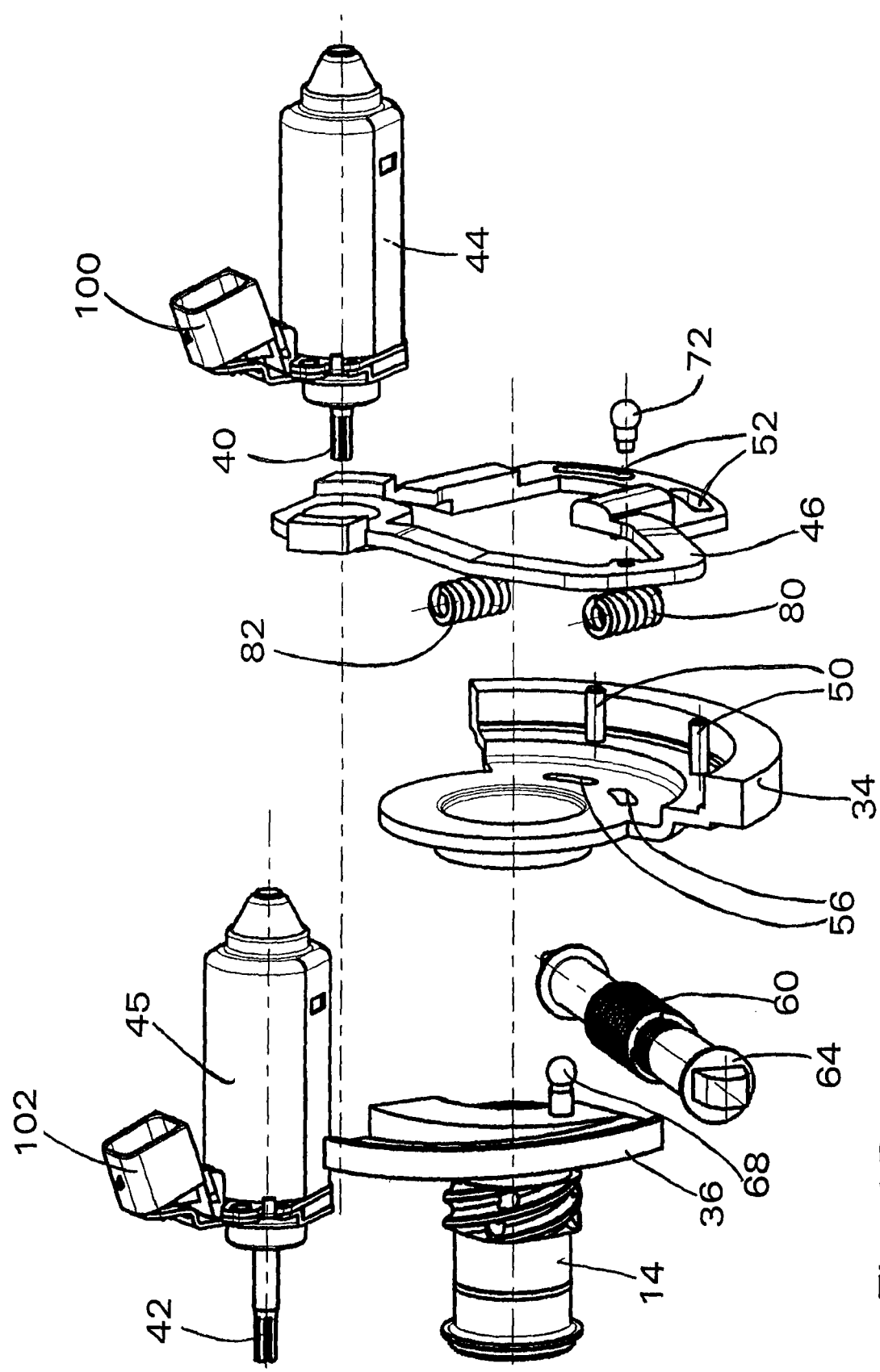
FIG. 2b: is an exploded view of another portion of the actuating device of FIG. 1.
Figure 2C:
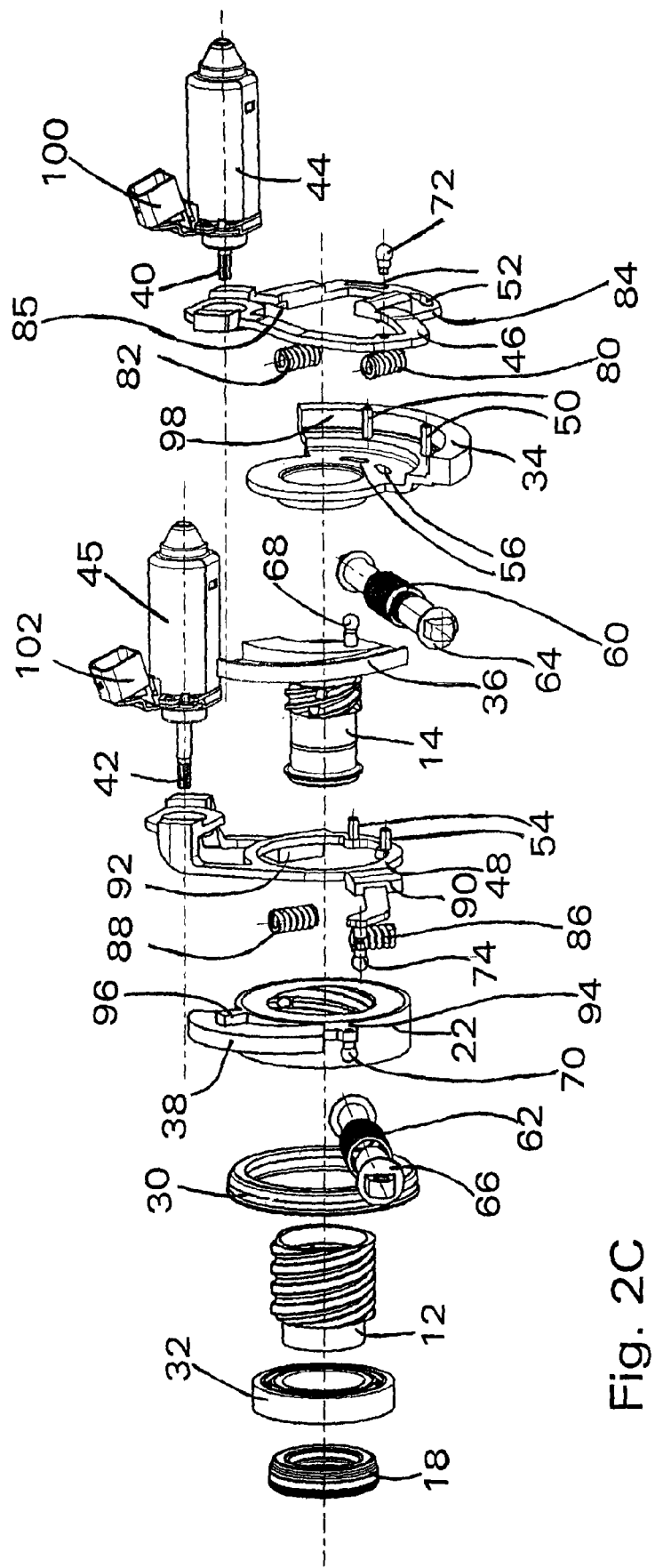
FIG. 2c: is an overall representation of the portions of exploded views.
Figure 3:
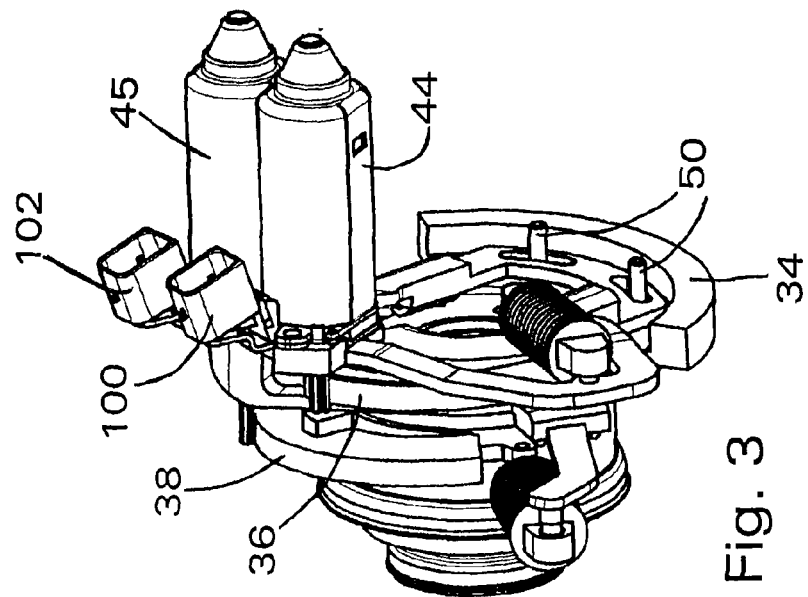
FIG. 3: The actuating device of FIG. 1 seen from the side in a condition when the sub-unit of the structural unit for installation has largely been assembled.
Figure 4:
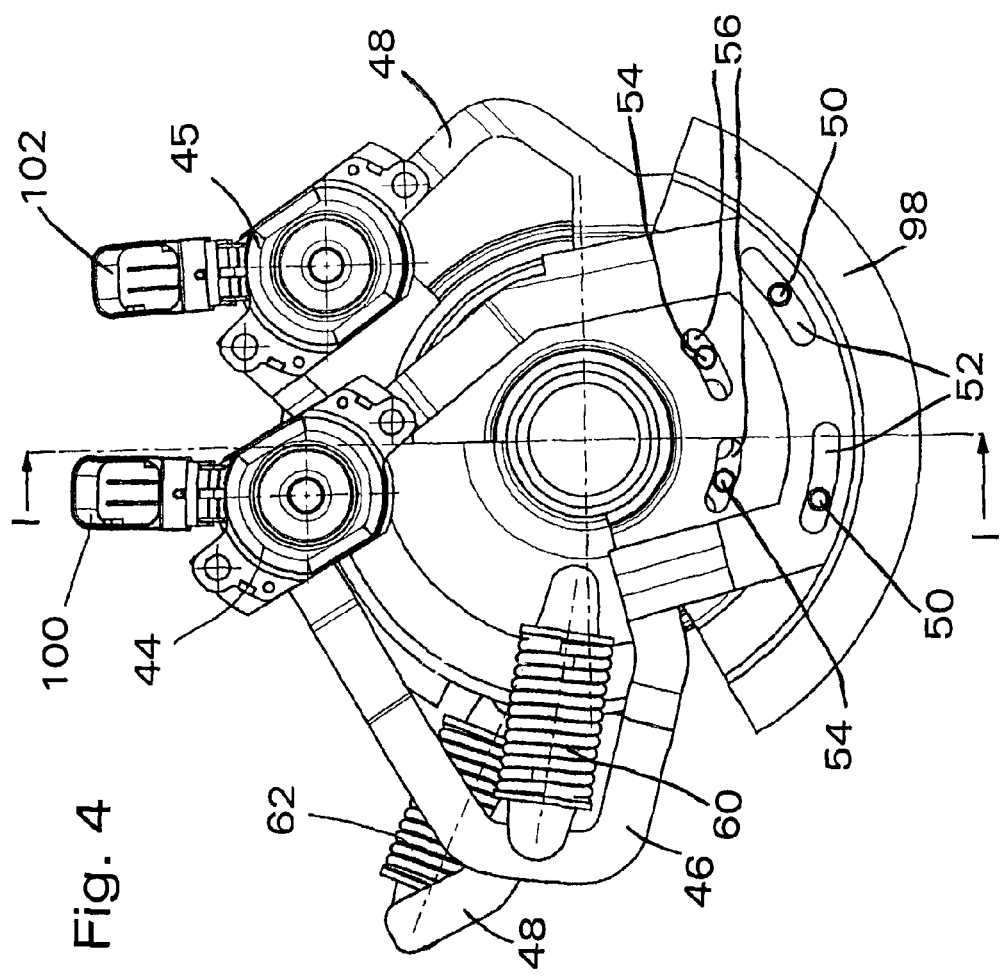
FIG. 4: Axial view of the assembled actuating device, viewed in the direction from a transmission toward a drive unit, between which the actuating device combined with the dual clutch into a structural unit is to be fitted.

As can be seen in FIGS. 2a, 2b and 2c, the first holder 46 is formed by an annular component that encloses a passage area which has a receiving opening for the housing of the actuator 44. According to FIG. 1, the second holder 48 is formed by an arm that has an annular component with a receiving opening for the housing of the actuator 45. The two holders serve not only to hold and position the actuators, but also as articulations for a first compensation spring arrangement 60 associated with the first actuating element 14 and a second compensation spring arrangement 62 associated with the second actuating element 22. The compensation spring arrangements are formed in each case by a compression spring and a two-component spring guide 64 or 66 respectively, articulated by a spring guide element that extends radially inward to a ball end 68 of the first actuating element 14 and to a ball end 70 of the second actuating element 22, respectively, and articulated with a radially outer spring guide element to a ball end 72 of the first holder 46 and to a ball end 74 of the second holder 48, respectively. The ball end 74 of the second holder 48 is arranged on an arm of the holder, and the ball end 72 is arranged directly on the annular component of the first holder 46. In FIG. 2b an attachment opening of the holder 46 for the separately shown ball end 72 can be seen.

The rotation positions of the first holder 46 and the second holder 48 that can be set by means of the bolts 50 or 54 and the slots 72 or 76 respectively, also concern the positioning of the ball end 72 relative to the rotational movement range of the first actuating element 14 and the positioning of the ball end 74 relative to the rotation position range of the second actuating element 22, so that by selecting the rotation position of the first holder 46 and of the second holder 48, in each case relative to the body portion 34, a respective over-dead-point configuration can be set for the two compensation spring arrangements 60 and 62. It is advantageous that the positions of the drive pinion 40 on the one hand and the ball end 72 on the other hand can be set in one operation, and that correspondingly the positions of the drive pinion 42 on the one hand and the ball end 74 on the other hand can be set in one operation. In the present case this is made possible by the fact that the actuator position and the ball end position are not independent of one another. However, it can certainly also be provided that the actuator on the one hand and the ball end on the other hand can be adjusted relative to one another, or that at least during assembly a certain relative position can be set and fixed. For example, it could be provided that the ball end can be moved within a slot or, during assembly, could be fixed, if necessary welded, in a desired position on the holder concerned or on an appropriately designed arm. However, the design according to FIGS. 1 to 4, which enables particularly simple assembly, is to be preferred.

To restrict the rotational movement range of the first actuating element 14 in both rotational directions, two stop-springs 80 and 82 are provided, which are arranged between on the one hand a respective end of the gearwheel segment 36 of the first actuating element 14 and on the other hand a stop 84 or a stop 85, respectively, of the first holder 46.

Correspondingly, two stop-springs, 86 and 88 are also associated with the second actuating element 22 to restrict the rotational movement range, which are arranged between on the one hand a respective stop element 90 or 92 of the second holder 48 and on the other hand a stop element 94 or 96 of the second actuating element 22.

It should be noted that a design can certainly be considered, in which a flange segment 98 of the body portion 34 forms abutments for an associated actuating element on both sides. In relation to the basic design represented in FIGS. 1 to 4, however, it is preferable to provide for some adjustability of the rotation end-stops together with the already described adjustability of the position of the drive pinion 40 and the ball end 72 relative to the first actuating element 14.

For the sake of completeness it should be mentioned that the actuators 44 and 45 are each made with a respective plug connector 100, 102, which serve for their connection to an electronic control unit. By energizing the actuator concerned rotational forces in the engagement or disengagement direction can be exerted on the associated actuating element 14 or 22. Advantageously, it can be provided that the actuators can also be used as rotation pickups, at least relative rotation pickups, to enable the actuating elements to be displaced in a defined manner, for example for the setting of a defined pre-load on the disengagement bearings during assembly with the associated dual clutch to form a structural unit for installation.

Figure 5:
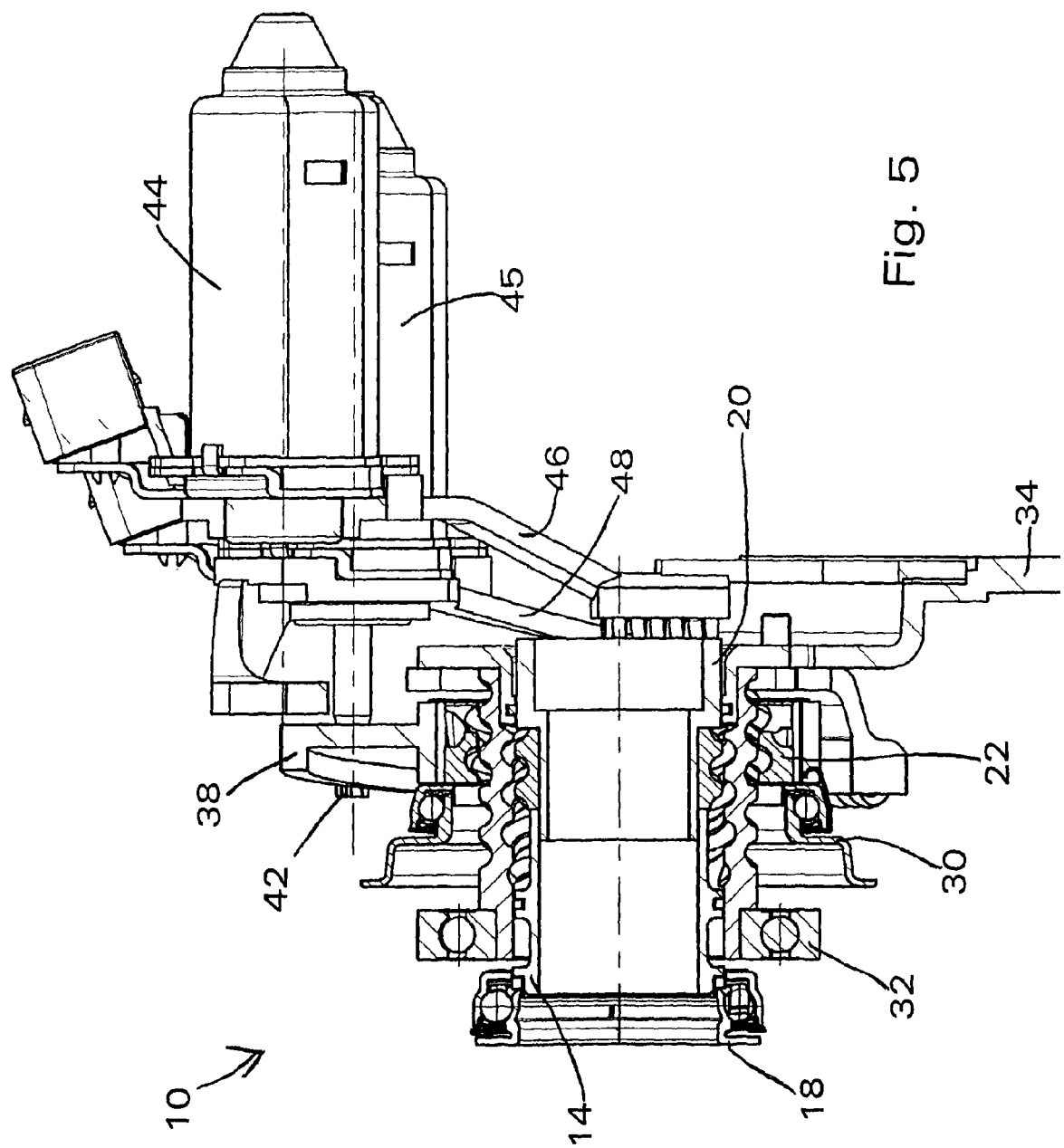
FIG. 5: Representation corresponding to FIG. 1, showing an embodiment variant of such an actuating device.
Figure 6:
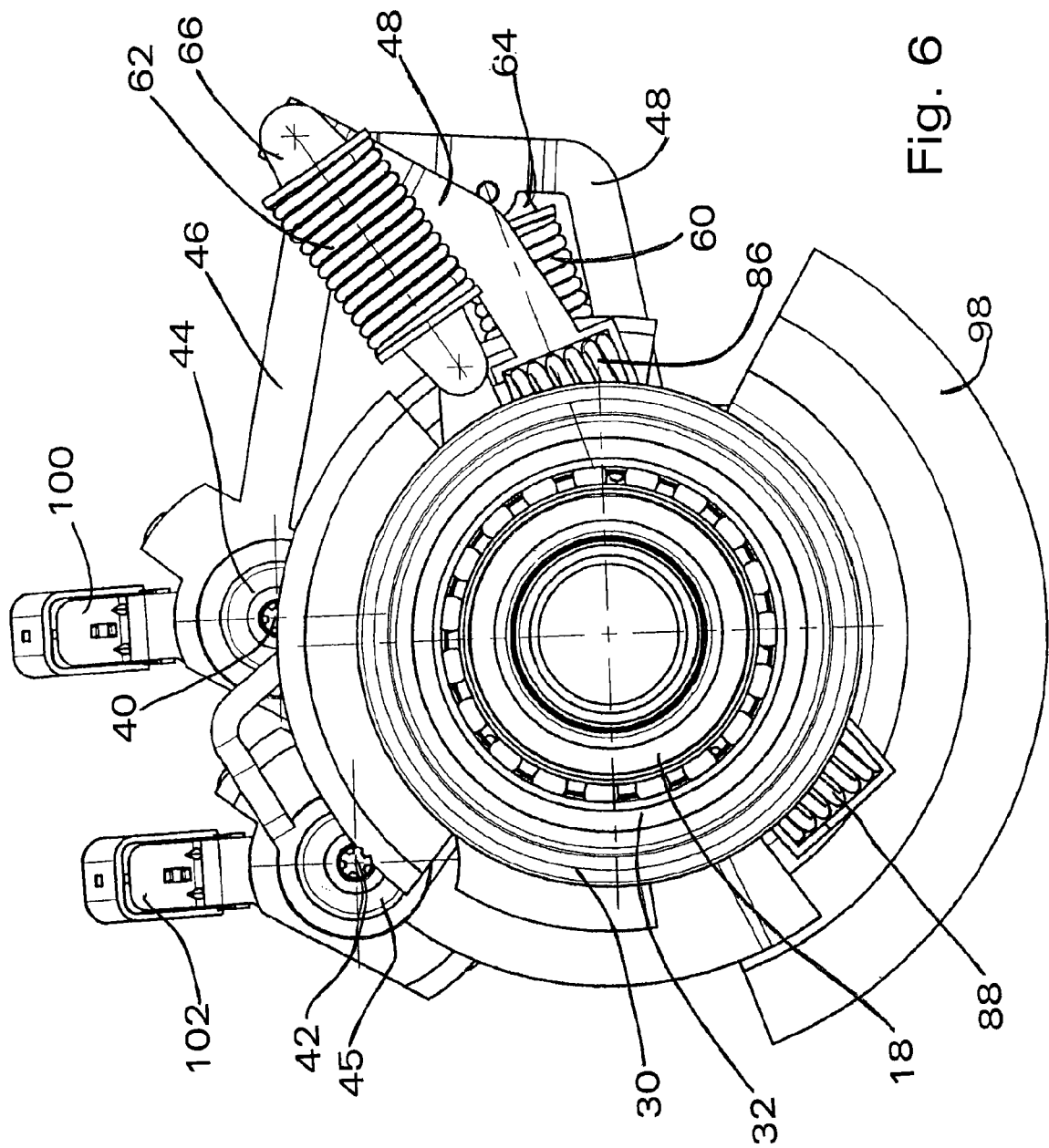
FIG. 6: Axial view of the actuating device in FIG. 5, viewed in the direction from the drive unit toward the transmission, between which the actuating device combined with the dual clutch into a structural unit is to be fitted.

The basic design of the example embodiment shown in FIGS. 5 and 6 corresponds to the example embodiment of FIGS. 1 to 4. For analogous or corresponding components the indexes used are the same as those in FIGS. 1 to 4. FIGS. 5 and 6, in particular the axial view shown in FIG. 6, can also be referred to for an understanding of the structure and mode of operation of the embodiment according to FIGS. 1 to 4. Thus, in FIGS. 5 and 6 various stop-springs can be seen.

Figure 7:
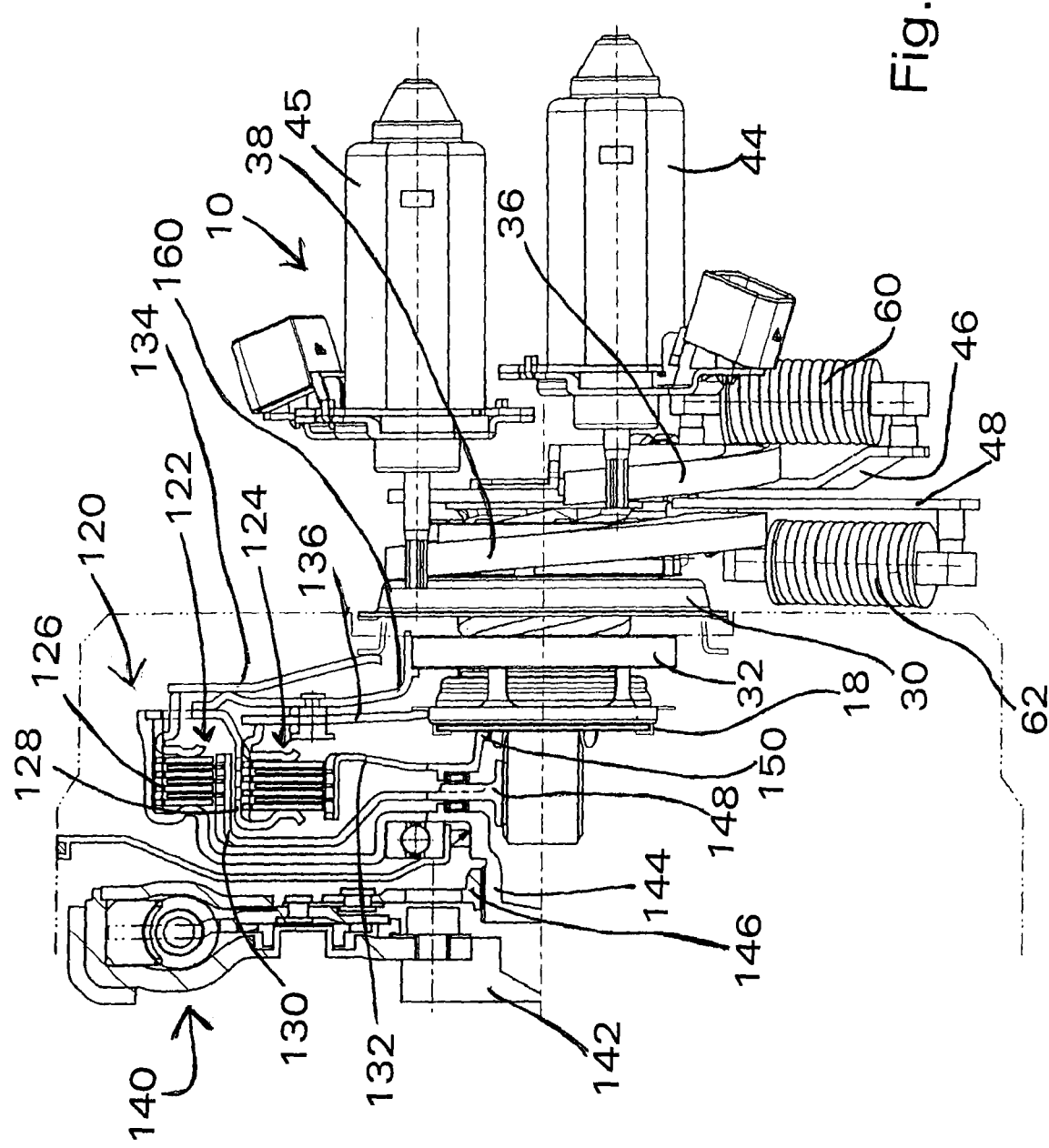
FIG. 7: Side view of an example embodiment of a structural unit for installation, formed by a wet-operating disk-type dual clutch and an actuating device in a form very similar to the actuating device of FIG. 1 and FIG. 5.

FIG. 7 shows an actuating module 10 whose structure corresponds substantially to the design according to FIGS. 1 to 4 and FIGS. 5 and 6, in combination with a dual clutch 120 comprising two wet-operating disk clutch assemblies 122 and 124. The disk clutch assemblies 122 and 124 are in each case formed of outer disks held on a respective outer disk carrier 126 or 128, and inner disks held on a respective inner disk carrier 130 or 132, which are pre-stressed against one another between a supporting area of the outer disk carrier and a contact pressure element in the engagement direction by means of a respective diaphragm spring 134 or 136 indicated only schematically. Thus, these disk clutch assemblies are of the NC type. The two inner disk carriers serve in each case as the output sides of the disk clutch assemblies concerned. The outer disk carriers are connected to rotate together and form the input side of the dual clutch, which is or can be connected to the output shaft (not shown) of an internal combustion engine via a torsion oscillation damper or a two-mass flywheel 140 and a flexible plate 142. The input side has a hub 144, which is rotationally coupled by splines to a hub 146 of the torsion oscillation damper or two-mass flywheel 140. The inner disk carriers each have a respective hub 148 or 150, which are coupled by splines to rotate together, each with an associated transmission input shaft of two radially nested transmission input shafts of the transmission.

The dual clutch 120 and the actuating module 10 are combined, i.e. assembled together, by means of the support bearing 32 ad a disk component 160 of the dual clutch fixed to the input side and rotating with it, to form a structural unit for installation, so that the dual clutch and the actuating module together as a unit, can be fitted in a motor vehicle drivetrain between the combustion engine or more generally a drive unit and the dual clutch transmission. The projection tolerances as regards the axial position of the diaphragm spring leaf ends of the diaphragm springs 134 and 136 are compensated and in the engaged condition of the two clutch assembles a defined pre-stress is exerted, respectively, on the two disengagement bearings 18 or 30, so that the annular component of the respective disengagement bearing on the diaphragm spring blade side rotates together with the diaphragm spring and thus with the input side. Otherwise than in the figures described earlier, the disengagement bearing 18 of the inner actuating element is made with a radially projecting annular portion which engages against the diaphragm spring blades of the diaphragm spring 16. The disengagement bearing 30 is shown by continuous lines in a position corresponding to the engaged condition of the disk clutch assembly 122. In addition, this disengagement bearing is shown in an axial position corresponding to a disengaged condition of the disk clutch assembly 122, which corresponds to the actuation condition of the diaphragm spring 134 represented in FIG. 7.

During the assembly of the dual clutch 120 and the actuating module 10 to form the structural unit for installation, the rotation positions of the actuator holders relative to the body portion that holds the supporting element, and thus the relative positions of the drive pinions of the actuators and the holder-side ball ends for the compensation spring arrangements 60 and 62, are adjusted and fixed. The rotation position set and fixed in each case is such that in the engaged condition of the disk clutch assembly 122 or 124 concerned, the diaphragm spring 134 or 136 exerts a defined pre-load on the associated disengagement bearing 18 or 30 respectively. Expediently, this can be done in such manner that the two actuating elements first contact the diaphragm spring blades with their disengagement bearings, and then, by rotation and simultaneous axial displacement relative to the supporting element corresponding to a defined torque with slight deflection of the diaphragm spring blades, are displaced farther so that the diaphragm spring leaves exert an appropriate axial force on the disengagement bearing 18 or 30 concerned. Expediently, the axial and rotary adjustment of the actuating elements can take place together with a rotary adjustment of the associated actuator holder 46 or 48, for example in such manner that the gearwheel segment of the actuating element concerned is held by means of the stop-spring corresponding to the engaged condition in contact against the actuator holder and the actuator holder is turned as well during the setting of the pre-load (if necessary repeatedly, to eliminate settling processes) and is then fixed on the body portion holding the supporting element when the rotation position has been reached. In the case of a design according to FIGS. 1 to 6, this fixing is carried out by screwing nuts or suchlike onto the bolts 50 or 54 concerned. In the case of a design corresponding to FIGS. 1 to 6, together with the pre-load the over-dead-point angle of the respective compensation spring arrangement 60 or 62 is also set at the same time, and the actuator 44 or 45 is also positioned correctly in relation to the respective gearwheel segment 36 or 38.

Alternatively however—above all with a different design of the actuating module—the pre-load on the one hand and the over-dead-point angle on the other hand can also be set independently of one another. For example, assembly can take place as follows:

1. The dual clutch and the actuating module are assembled together by means of the support bearing.
2. Then, the two actuating elements (which can also be referred to as spindle nuts) are brought in contact against the diaphragm spring blades of the dual clutch with a defined torque, preferably automatically. During this, the minimum pre-load for the disengagement bearings is set. If necessary this process must be carried out several times, with intermediate decoupling, in order to eliminate settling processes. To ensure a stable coupled position, thereafter or at the same time the respective rotation end-stops corresponding to the engaged condition for the two actuating elements are adjusted and then fixed in the position that gives the minimum pre-load, by riveting, welding or—in the case of a design similar to FIGS. 1 to 7—by screwing nuts or suchlike onto connection bolts.

3. Once the stop on the "coupling side" has been set, the next step would be to set the outer articulation point for the compensation spring arrangement of the actuating element concerned, in order to adjust the over-dead-point angle. Expediently, this can be done in a rotation position of the actuating element concerned that corresponds to an open clutch assembly, or also in the position corresponding to the engaged condition of the clutch assembly. Expediently, a device which automates the adjustment process can be used.

4. If desired, independently adjustable rotation stops for the actuating elements, corresponding to the de-coupled position can be provided, which in principle could also be formed by components of the transmission. Adjustment could then take place by rotating the system as a whole in slots. The transmission-side stops can for example be formed by spring-loaded levers of transmission band-brakes, so that the actuating module can in addition be used for actuating the transmission brakes.

Figure 8:
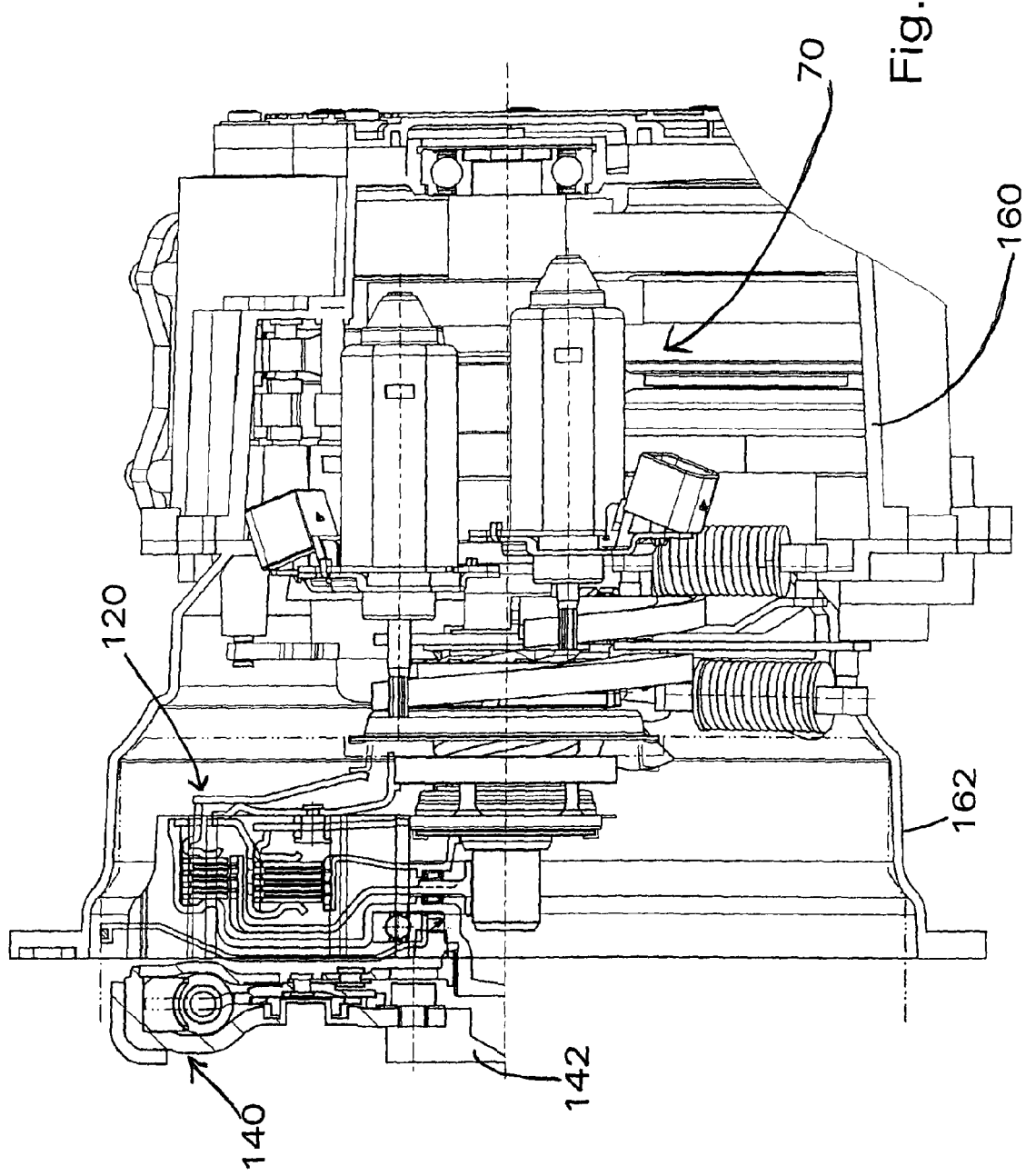
FIG. 8: The structural unit of FIG. 7 accommodated in a transmission housing bell between a drive unit (in particular an internal combustion engine) and a dual-clutch or change-under-load transmission of a motor vehicle drivetrain.

FIG. 8 shows the structural unit for fitting, formed from the actuating module 10 and the dual clutch 120, installed in the transmission housing 160 and a transmission housing bell 162 bolted onto it between the transmission and a combustion engine (not shown), in particular an internal combustion engine.

Figure 9:
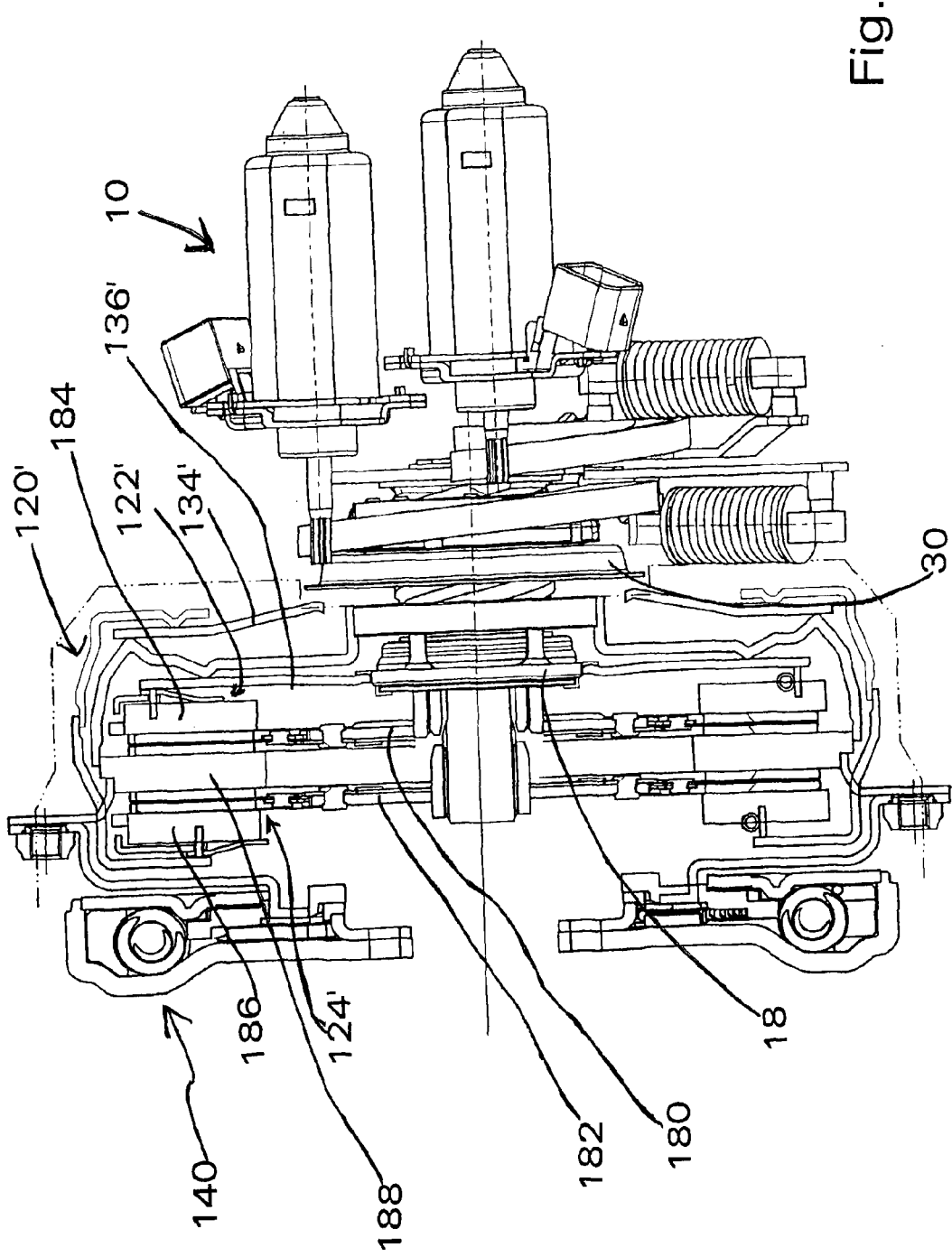
FIG. 9: Side view of an example embodiment of a structural unit for installation, formed by a dry-operating, friction-disk dual clutch and an actuating device in a form very similar to the actuating device of FIGS. 1 and 5.

What has been said concerning FIG. 7 applies correspondingly also to FIG. 9. Instead of a wet-operating dual disk clutch, the actuating module 10 is this time combined with a dry-operating friction-disk dual clutch 120' to form a structural unit for installation, which are fitted together, the dual clutch 120' comprises a first friction-disk clutch 122' and a second friction-disk clutch 124', each formed of a clutch disk 180 or 182 whose friction linings can be clamped between a contact pressure plate 184 or 186 and a common counter-plate 188. Together with a clutch housing the counter-plate 188 forms an input side of the dual clutch, and the contact pressure plates 184 and 186 too, which can move axially relative to the counter-plate 188 and are pre-stressed by a diaphragm spring 134' or 136' in the friction lining clamping direction, belong to the input side and are held in the clutch housing. On the other hand the friction disks 180 and 182 form the respective output sides of the first and second clutch assemblies, and each has a respective hub coupled by splines to a respective one of two radially nested transmission input shafts.

To disengage the clutch assemblies, the respective diaphragm spring 134' or 136' must be deflected by means of the disengagement bearing 18 or 30 of the associated actuating element, the spring blades moving axially in the direction toward the combustion engine, exactly as happens in the case of the diaphragm springs 134 and 136 for disengaging the disk clutch assemblies 122 and 124 shown in FIG. 7. Assembly and adjustment in relation to a defined pre-load can take place exactly as described earlier with reference to the structural fitting unit of FIG. 7. The input side of the dual clutch 120 can again be connected to a drive output shaft of a combustion engine by means of a torsion oscillation damper or a two-mass flywheel 140, possibly via a flexible plate 142.

Figure 10:
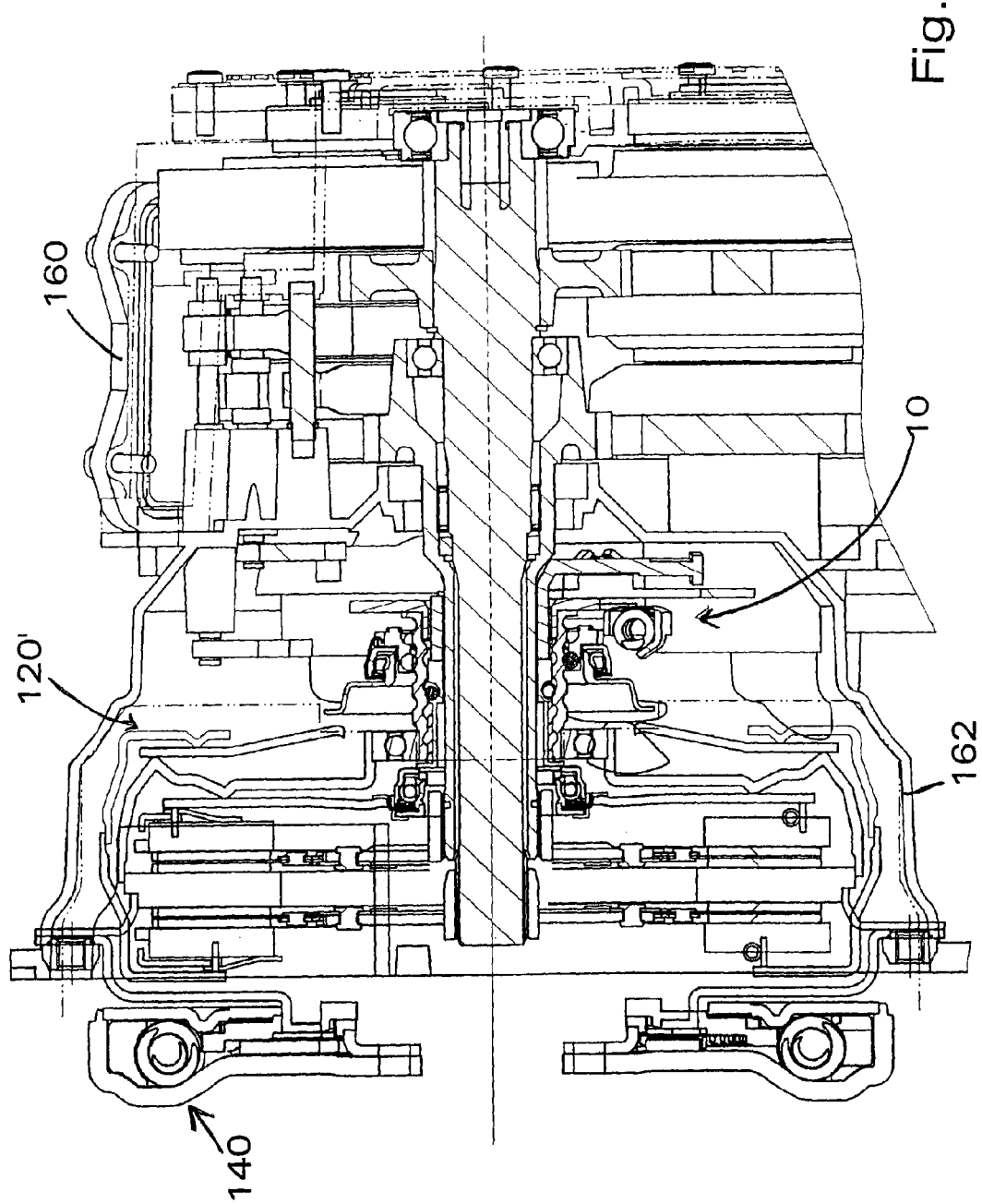
FIG. 10: Sectioned representation of the structural unit of FIG. 9 accommodated in a transmission housing bell between a drive unit (in particular an internal combustion engine) and a dual-clutch or change-under-load transmission of a motor vehicle drivetrain.

FIG. 10 shows the structural fitting unit formed by the actuating module 10 and the dual clutch 120', installed and accommodated in a transmission housing 160 and a transmission housing bell 162 bolted to it.

The actuating module 10 of FIGS. 7 and 8 on the one hand and that of FIGS. 9 and 10 on the other hand can be the same module or at least a module of identical structure, which can therefore be used optionally either with a wet-operating disk dual clutch or a dry-operating friction-disk dual clutch. Manufacturing tolerances, in particular position tolerances relating to the diaphragm spring blade ends in the engaged condition of the clutch assembly concerned, can be simply compensated, preferably and expediently while setting a defined pre-load on the disengagement bearing concerned. At the same time or separately, the over-dead-point angle and thus the compensation spring characteristic line is set, so that the compensation spring characteristic line is matched to the disengagement force characteristic of the clutch assembly concerned or of the diaphragm spring that determines or participates in determining it, so that overall the desired NO characteristic is achieved. Conversely, in the case of NO clutch assemblies, an overall NC characteristic can be produced by overcompensation by the compensation springs, in which again the compensation spring characteristic is matched to the engagement force characteristic of the clutch assembly or that of the diaphragm spring which determines or helps to determine it. To preserve the matches, either the clutch assembly or the actuating module, for example the actuating element concerned, should be equipped with wear compensation means.

It is a major advantage that all the adjustments and assembling of the dual clutch on the one hand and of the actuating module on the other hand can take place in relation to one another already before the structural unit is fitted in a motor vehicle drivetrain. This substantially simplifies the process of assembly into the drivetrain by the manufacturer of the motor vehicle, and assembly or adjustment errors can be avoided.

Since the same actuating module can be used for both wet-operating and dry-operating dual clutches, the number of components to be held in stock is reduced, with corresponding cost savings.

In the example embodiments explained above, a sleeve-like spindle with outer and inner ball-guiding threads is used as the supporting element. Such a "double" spindle is only comparatively difficult and correspondingly costly to make, and it also takes up a comparatively large amount of radial fitting space.

Figure 13:
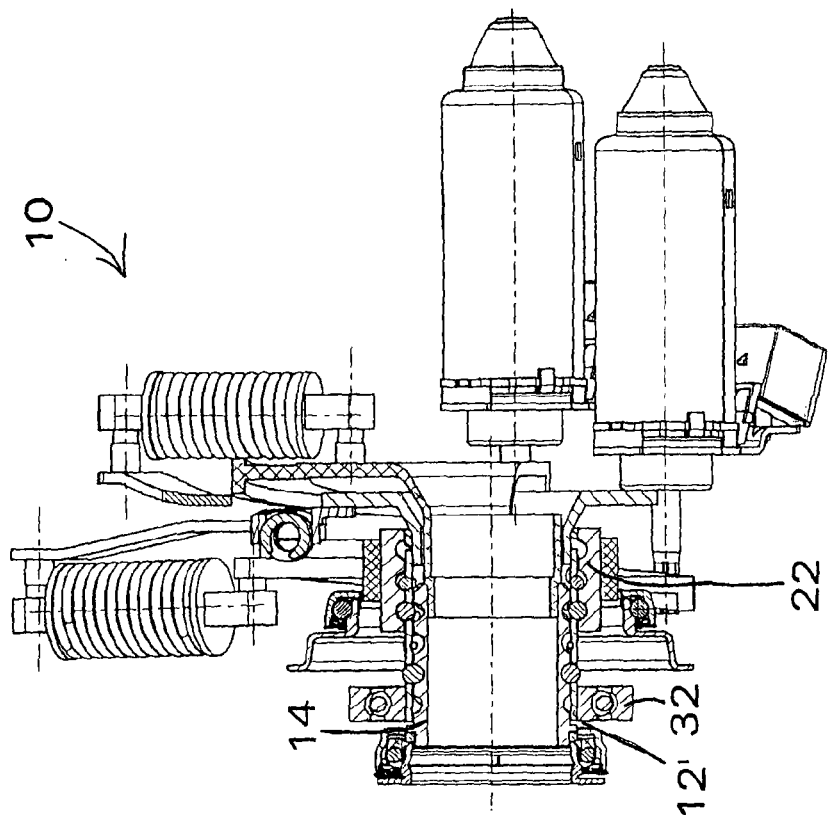
FIG. 13: Another embodiment variant of an actuating device, in which, instead of a spindle-type supporting element, a ball cage is provided as the supporting element.
Figure 11:
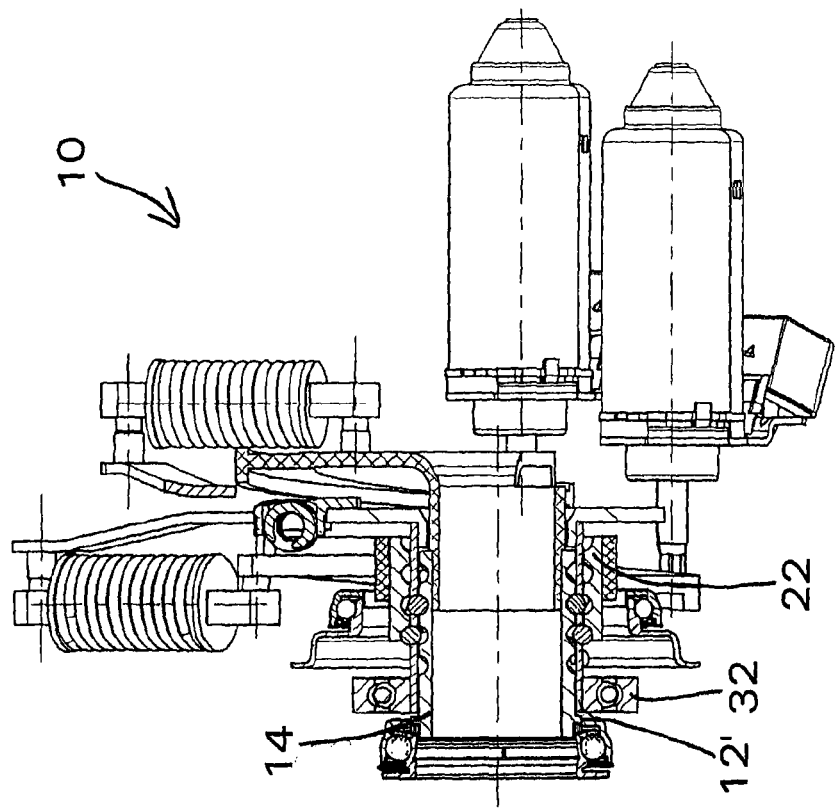
FIG. 11: Embodiment variant of the actuating device, in which, instead of a spindle-type supporting element, a ball cage is provided as the supporting element.

In contrast, two embodiment variants of the actuating module 10, shown in FIGS. 11 and 13, have a simple, sleeve-like ball cage as the supporting element, which acts on both sides, namely radially inward and radially outward, so that balls can roll in the threads of the outer and inner actuating element. Thus, two ball levels are produced so that when only one actuating element is moved, the balls can roll only in the ball thread of the actuating element concerned. In this actuating element, therefore, rolling friction occurs instead of sliding friction which would result in lower efficiency. To produce the two ball levels the balls associated with the outer actuating element are introduced into the cage from outside and the balls associated with the inner actuating element from inside, the cage defining the ball positions by virtue of openings having a smaller diameter than the balls, which are arranged in one or in two spiral lines that correspond to the course of the threads. If a lower efficiency were acceptable, then only one ball plane could also be realized so that any particular ball engages on one side with the thread of the outer actuating element and on the other side with the thread of the inner actuating element. In such a case the openings of the ball cage that define the ball positions would have a diameter slightly larger than any individual ball.

Figure 12C:
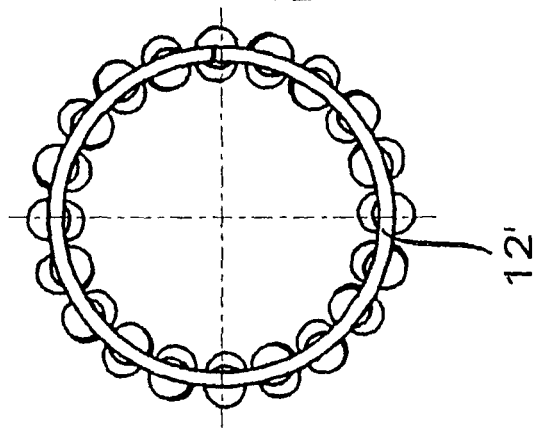
FIG. 12c: is yet another view of the ball cage in FIG. 11.
Figure 12A:
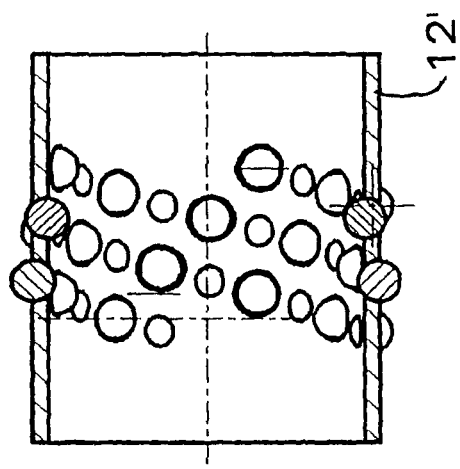
FIG. 12a: is a view of the ball cage in FIG. 11.
Figure 12B:
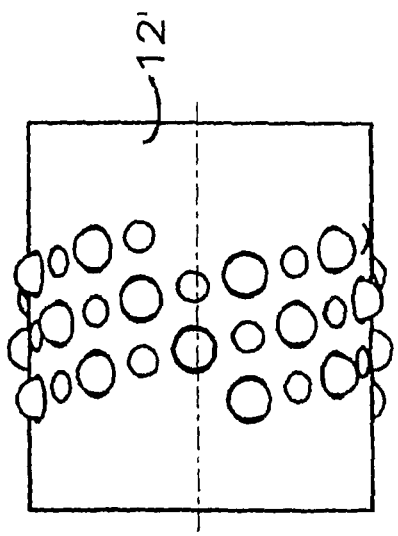
FIG. 12b: is another view of the ball cage in FIG. 11.
Figure 14A:
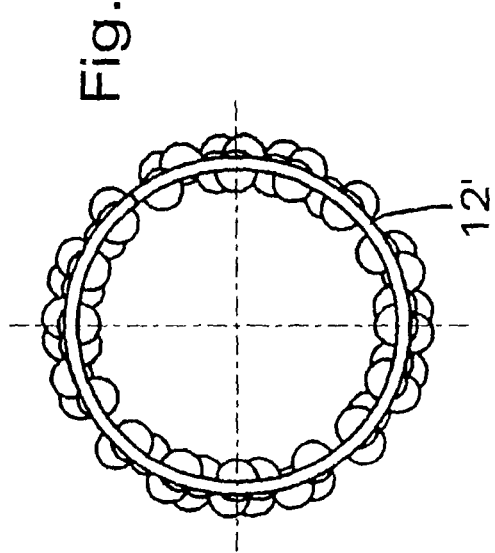
FIG. 14a: is a view of the ball cage in FIG. 13.
Figure 14B:
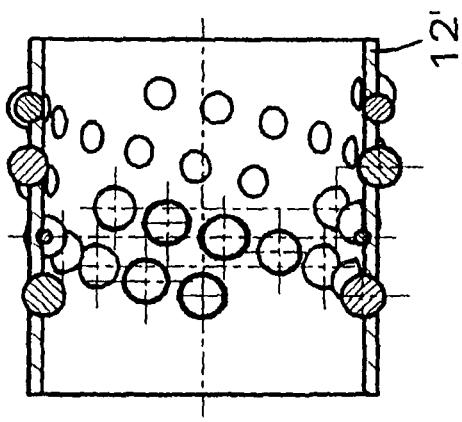
FIG. 14b: is another view of the ball cage in FIG. 13.
Figure 14C:
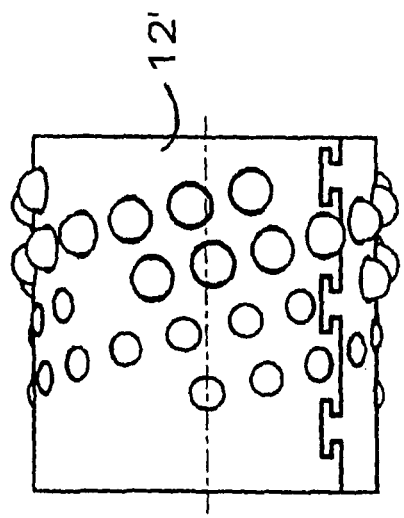
FIG. 14c: is yet another view of the ball cage in FIG. 13.

In FIGS. 11 and 13 the ball cage that forms the supporting element is indexed 12' and, like the supporting element in the example embodiments described earlier, it carries the support bearing 32. FIGS. 12a, 12b and 12c show the ball cage with the balls according to FIG. 11, viewed in cross-section (FIG. 12a), in a lateral plan view (FIG. 12b) and in an axial plan view (FIG. 12c). FIGS. 14a, 14b and 14c show the ball cage according to FIG. 13, also viewed in cross-section (FIG. 14a), in a lateral plan view (FIG. 14b) and in an axial plan view (FIG. 14c).

As can be seen in the lateral plan views, in both example embodiments the ball-holding openings are arranged along a spiral line, such that according to FIGS. 11 and 12 an inner and an outer ball are inserted in alternation, while according to FIGS. 13 and 14 first the set of inner balls, and after that the set of outer balls are inserted. It could also be expedient to provide two parallel spiral lines of holding openings running in the same direction, of which the holding openings in one spiral line hold the inner balls and the holding openings of the other spiral line hold the outer balls.

Such a ball cage can be made very simply and inexpensively. For example, the cage can be made from a sheet in which the ball holes are stamped on both sides and embossed. From the sheet, the sleeve-like ball cage shape can be formed, and a positively interlocked engagement of the joined sheet ends can be provided, as illustrated in FIG. 14b.

It is also conceivable to make the ball cage from two separate sheet components, preferably two sheet components having the same structure, in which the ball holes are in each case stamped and embossed in the sheet from only one direction. The two sheets can then be joined to one another, with positive interlock, by material merging or by friction force locking, to form the ball cage with the holding openings that act inward and outward.

A single-sided ball cage can be made similarly to a ball bearing. Overall, its production is simple and it can be made using ordinary stamping and forming tools.

With reference to all of the embodiments and embodiment variants described above, it should be pointed out that those with knowledge of the field can certainly consider variations. For example, it is conceivable to mount the supporting element, or a separate supporting element for each of the two actuating elements, by means of a rotary bearing arrangement on the body portion holding the actuator or actuators and form them with the gearwheel segment or make them able to be driven in rotation by the respective actuator in some other way, in order to rotate this supporting element now in the form of a rotary member, by means of the actuator, so as to displace the actuating element axially.

Those with knowledge of the field will also easily be able to derive from the embodiments, their variants and modifications described above, analogously designed actuating devices or spindle-type actuating modules for a single clutch comprising only one friction clutch assembly, such as a disk clutch or friction-disk clutch assembly, by omitting one of the actuators and the actuating element associated with it.

Other example embodiments and embodiment variants of actuating devices provided for single clutches are described below. Without placing any restriction on generality, it is again assumed that the associated single clutch comprises a clutch assembly of the NC type, so that, however, an overall system characteristic of the NO type can be realized by a compensation spring if desired. For a person with knowledge of the field, it would also not be a problem to derive corresponding actuating devices, which are provided for actuating a single clutch with a clutch assembly of the NO type, such that an overall NC characteristic can likewise be produced by overcompensation by means of a compensation spring, if that is desired.

Figure 16:
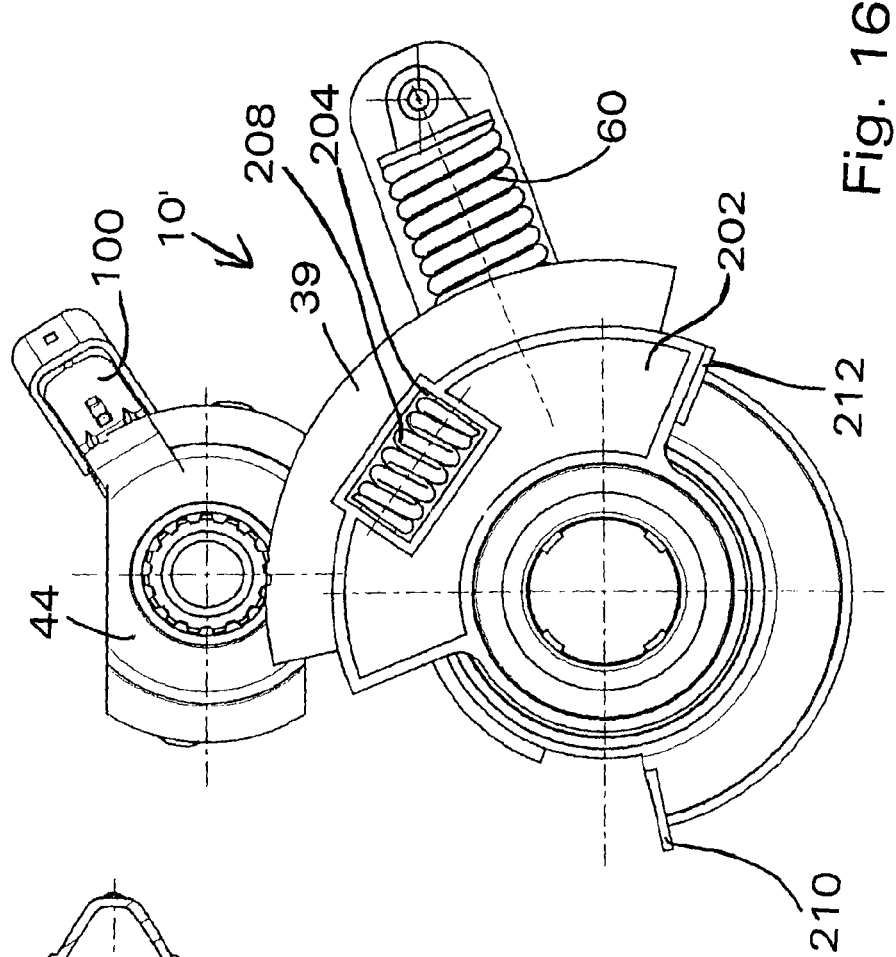
FIG. 16: Axial plan view of the actuating device in FIG. 15.
Figure 15:
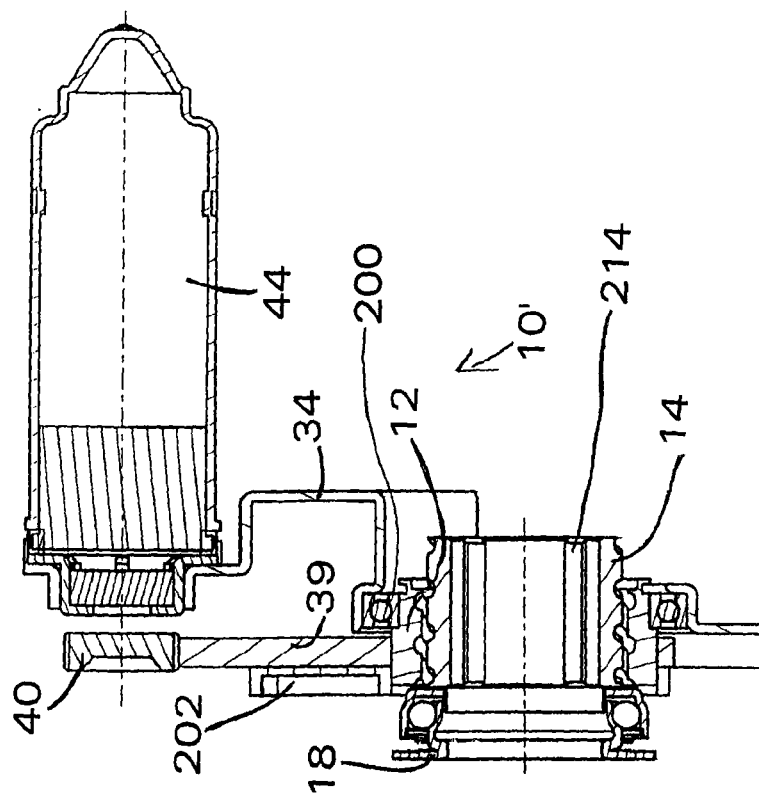
FIG. 15: Embodiment of an actuating device provided for a single clutch, shown in cross-section.

The actuating device 10' shown in FIGS. 15 to 17, which can also be referred to as a spindle-type actuating module, is provided for actuating a single clutch with only one friction clutch assembly, for example a disk clutch or a friction-disk clutch assembly, and it correspondingly comprises only one actuating element 14, which carries a disengagement bearing 18. A special feature is that the supporting element 12 provided radially outside the actuating element is arranged on the body portion 34 that holds the actuator 44 via a rotary bearing 200. This actuating element 22, made as a rotary component, is held axially stationary by the rotary bearing and has connected fixed to it a gearwheel segment 39 which meshes with the drive pinion 40 of the actuator 44. The compensation spring arrangement 60 articulated on the outside to an arm of the body portion is articulated radially on the inside to the supporting element 12 or—preferably—to the gearwheel segment 39.

In order to limit elastically the rotational movement range for the supporting element 12 and thus the axial displacement range for the actuating element 14 coupled to the supporting element by the balls running in the ball threads in accordance with the pitch of the ball threads, an abutment disk element 202 is arranged on the outer circumference of the supporting element 12 adjacent to the gearwheel segment 39. Both the abutment disk element 202 and also the gearwheel segment 39 have respective spring apertures 204 and 206. Into the spring apertures 204 and 206 is inserted a common stop-spring 208, in such manner that the stop-spring engages in both apertures. On a radially projecting section the body portion 34 has stops 210 and 212, against which the abutment disk element 202 can rotate and which, by virtue of the stop-spring 208, also act as spring stops for the gearwheel segment 39.

The embodiment variant of the actuating device 10' shown in FIGS. 18 to 20 differs only in having another arrangement and orientation of the actuator 44', such that instead of a gearwheel transmission formed by the drive pinion and the toothed rim segment provided on the outer circumference of the gearwheel segment, a type of crown gear transmission is formed, in which the gearwheel segment has an axially orientated toothed rim segment in a radially outer rim zone, which meshes with the drive output pinion 40'.

In both embodiments with the supporting element 12 formed as a rotary member it is not essential to support the actuating element against rotation, but in principle that is possible, for example by virtue of engaging formations 214 on the internal circumference, which engage in stationary matching formations possibly of a sleeve component that surrounds the transmission input shaft, the formations and matching formations being designed such that unimpeded axial displacement of the actuating element 14 is possible. Another option is to provide a radial guide for the actuating element 14 on the outer circumference of the transmission input shaft.

A defined pre-load on the disengagement bearing 18 can be set by fixing the gearwheel segment 39 in a defined relative rotation position on the supporting element 12, which gives this pre-load on the disengagement bearing 18 and possibly also—if desired—a defined over-dead-point configuration of the compensation spring 60.

Figure 22:
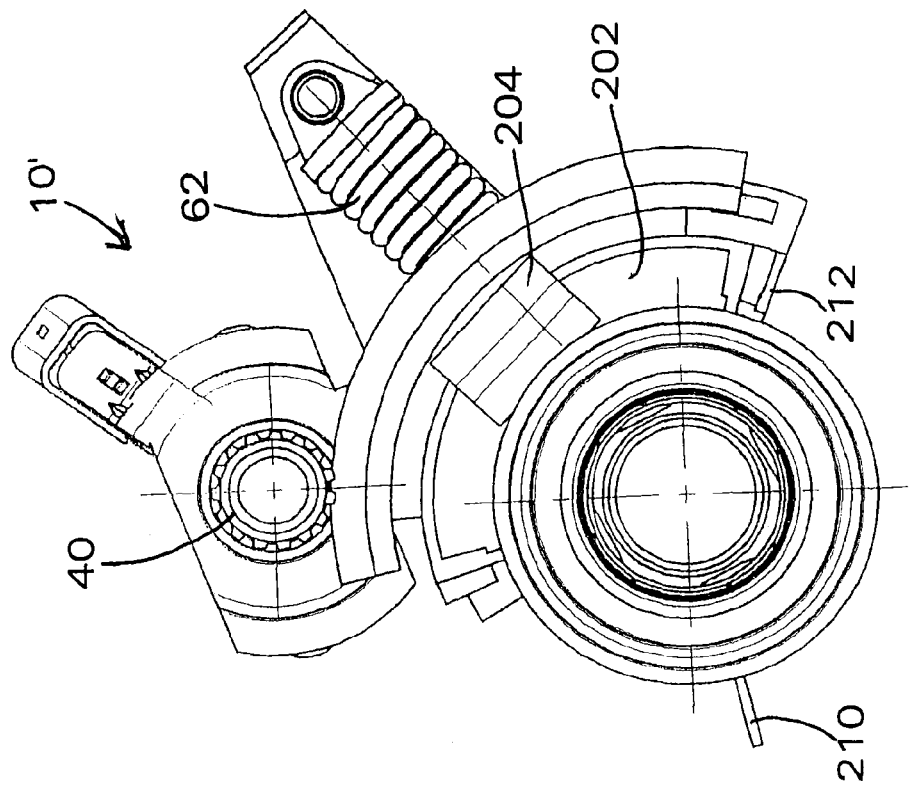
FIG. 22: Axial plan view of the actuating device in FIG. 21.
Figure 21:
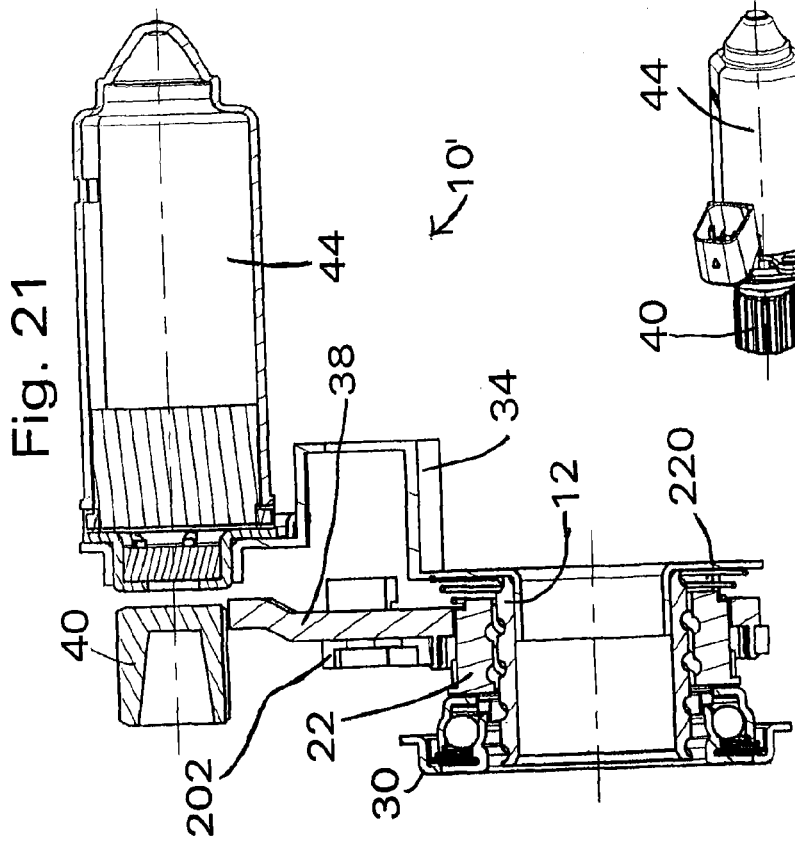
FIG. 21: A further example embodiment of an actuating device for a single clutch.
Figure 23:
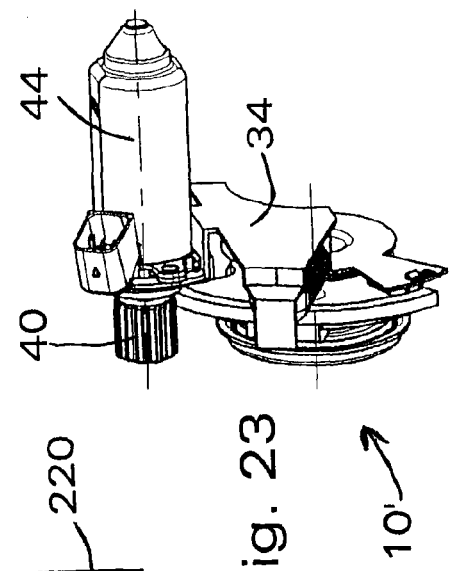
FIG. 23: Perspective side view of the actuating device in FIG. 21.

In the embodiment shown in FIGS. 21 to 23—as in the embodiments shown in the figures pertaining to the dual clutch—a stationary, i.e. non-rotating supporting element 12 is provided, which is connected fixed to the body portion 34 holding the actuator 44. The axially displaceable actuating element 22, which can be driven in rotation (and is thus designed as a rotary member) encloses the supporting element 12 radially on the outside and, as in the embodiments of FIGS. 15 to 19 and the embodiments according to FIGS. 1 to 10 that relate to the dual clutch, there is engagement by virtue of balls between ball threads of the supporting element on the one hand and the actuating element on the other hand, which converts the rotational movement imparted by the actuator into the rotary member, in this case the actuating element 22, into an axial movement of the actuating element. The actuating element 22 carries the disengagement bearing 30.

As in the embodiments shown in FIGS. 15 to 20, an abutment disk component 202 is provided, which is in this case mounted to rotate on an axially projecting flange of the gearwheel segment 38, such that by means of a stop-spring engaged in a respective spring aperture (spring aperture 204 of the abutment disk component) an elastic rotary coupling is formed between the gearwheel segment 38 and the abutment disk component 202, in order by virtue of the stops 210 and 212 on the body portion to produce an elastic rotation range limit effective in both directions for the actuating element 22, and thus also an elastic axial displacement range limit for the actuating element 22.

A special feature in the embodiment shown in FIGS. 21 to 23 is that a pre-load spring 220 acts between the body portion 34 and the actuating element 22, and the gearwheel segment 38 is made as a rotary member separate from the actuating element and, in a first axial position relative to the actuating element 22, is not coupled to the latter for conjoint rotation, so that the actuating element 22 can rotate relative to the gearwheel segment 38. Such rotation can for example take place as a result of an axial displacement of the actuating element 22 by the axial force of the pre-stressing spring 220, in order to set a defined pre-load for the disengagement bearing 30. The disengagement bearing 30 then presses against the diaphragm spring blade ends of the diaphragm spring of the associated clutch, with which the actuating device 10' also called the actuating module, is assembled to form a structural group. In FIG. 21 the gearwheel segment 38 is shown in a position farther to the right, in which the gearwheel segment 38 is decoupled from the actuating element 22. In a relative axial position farther to the left, the driving formations on the inside circumference of the bearing flange for the abutment disk component 202 engage in driving formations on the outer circumference of the actuating element 22, so that the gearwheel segment 38 and the actuating element 22 are connected rotationally fixed to one another. Radial guiding of the gearwheel segment 38 is provided by a radially inner guiding surface of the gearwheel segment and a guiding surface close to the driving formations, on the outer circumference of the actuating element 22.

The compensation spring 62 is articulated radially on the inside to the gearwheel segment 38, and the gearwheel segment 39 meshes, by a toothed rim on the outer circumference, with the drive pinion 40 of the actuator 44. In the position of the gearwheel segment 38 shown in FIG. 21, since it is decoupled from the actuating element 22 the pre-stressing spring 220 acts only upon the actuating element 22, so that by holding the gearwheel segment 38 in this position, or bringing the gearwheel segment 38 to and holding it in this position the pre-load for the disengagement bearing 30 can take place automatically. In the axial position and thus also rotation position reached by the actuating element 22, which if necessary can also compensate any positional tolerance of the diaphragm spring blade ends, the gearwheel segment 38 is then pushed in the direction toward the clutch (to the left in FIG. 20) in order to bring the driving formations into mutual engagement and thereby to connect the gearwheel segment 38 rotationally fixed to the actuating element 22. This axial displacement cam take place by virtue of a slightly oblique position of the compensation spring 62 made as a compensation spring, by forces exerted by the compensation spring which act in the axial direction. When this rotation-driving coupling is formed, then by virtue of the pitch of the ball thread rotational movement imparted by the actuator 44 to the actuating element 22 via the gearwheel segment 38 is converted into an axial movement of the actuating element for actuating the clutch by means of the disengagement bearing.

In the embodiment shown in FIGS. 24 to 26 the design principles of the embodiments shown in FIGS. 15 to 20 on the one hand, and in FIGS. 21 to 23 on the other hand, are combined. As in the systems according to FIGS. 15 to 20, the supporting element 12 is provided in the form of a rotary member. The pre-stressing spring 220 acts upon the actuating element 14 arranged radially on the inside, so that the separately made gearwheel segment 39, in a first axial position farther to the right as shown in FIG. 23, allows the supporting element 12 to rotate as a result of an axial displacement of the actuating element 14 due to the pre-stressing force of the pre-stressing spring 220 without conjoint rotation of the gearwheel segment 39, and in a second axial position farther to the left according to FIG. 23 shown in the figure, the actuating element is connected to the supporting element 12 by virtue of their respective rotation-driving formations so that they rotate conjointly. To displace the gearwheel segment 39 axially into rotation-driving engagement, a spring ring 222 is provided clamped between the rotary bearing 200 and the gearwheel segment 39. The pre-load on the disengagement bearing can be set just as explained for the embodiment shown in FIGS. 21 to 23.

A radial guide for the actuating element 14, provided on the transmission input shaft, is again appropriate in the embodiment shown in FIGS. 24 to 27. When the gearwheel segment 39 is rotated by the actuator 44, the supporting element (also called the spindle nut) rotates correspondingly and in accordance with the pitch of the ball thread an axial movement is imparted to the actuating element 14 (also called the spindle shaft) so as to actuate the clutch by means of the disengagement bearing 18 connected fixed to the actuating element 14.

Assembly, and the setting of the pre-load on the disengagement bearing, can for example take place as follows. The structural group formed of the gearwheel segment, the abutment disk component, the stop-spring and the compensation spring, is held axially in the axial position where there is no rotation-driving engagement with the rotary member (actuating element 22 or supporting element 12), for example suspended by means of a hook on the body portion or housing, or held by means of a bayonet joint. During or after assembly with the associated clutch the pre-load is set on the disengagement bearing 18 or 30 automatically by the pre-stressing spring 220. Thereafter, but before the clutch is first actuated, the gearwheel segment is released to allow it to move into rotation-driving engagement with the rotary member under the action of the compensation spring or the spring ring 222. This release can for example take place by means of the actuator 44 if it turns the gearwheel segment 38 or 39 through a small rotation angle, for example a couple of degrees, in a defined direction, in particular the coupling direction, against the action of the stop-spring, whereby the unit described, comprising the gearwheel segment, comes clear of the hook or bayonet joint, for example by snapping free, and is then pushed by the axial spring action on the rotary component axially into rotation-driving engagement with the rotary component, i.e. in to interlocked connection therewith. The engagement between the drive pinion 40 or 44 and the toothed rim zone of the gearwheel segment is such that the production of this rotation-driving engagement, and in the case of the embodiment according to FIGS. 20 to 22, the axial displacement of the actuating element 22 to actuate the clutch, is possible without difficulty. For this, the rotation axis of the actuator 44 is parallel to the transmission axis, in order to enable axial movement of the gearwheel segment relative to the drive pinion 40 or 44. For the axial movement, the drive pinion and the gearwheel segment are made with helical teeth.

Another expedient possibility for setting the pre-load, for example in the embodiments of FIGS. 15 to 20, is to fit the clutch and the actuating module one after the other into the drivetrain, so that after the clutch has been fitted the pre-load is set by axial displacement of the embodiment module 10' including the actuator. In the case of an axially fixed rotary component this enables the rotation axis of the actuator not to be parallel to the transmission axis, for example as in FIGS. 18 to 20.

The example embodiment shown in FIGS. 27 to 29 is based on the design principle of the embodiments in FIGS. 15 to 20 and FIGS. 24 to 26. The rotary member that can be rotationally driven by the actuator 44 via the gearwheel segment 39 is not the actuating element 14, but rather, the supporting element 12 held fixed on the body portion 34 by means of the rotary bearing 200. Otherwise than in the embodiment of FIGS. 23 to 25, the gearwheel segment 39, however, is attached fixed on the supporting element 12, similarly as in the embodiments of FIGS. 15 to 20. Also present is the abutment disk component 202, which is coupled to the gearwheel segment 39 via the stop-spring 208 in order to provide an elastic rotation, movement range limit against the stops 210 and 212.

The special feature of the embodiment in FIGS. 27 to 29 is that the actuating element 14 is made with an integrated wear compensation mechanism. For this, the actuating element 14 comprises a first part-element 14a coupled to the supporting element 12 via ball threads, and a second part-element 14b that carries the disengagement bearing 18, which is formed like a pot or sleeve. The first part-element 14a is made with an engagement or coupling section 230 which tapers in the direction of the disengagement bearing 18, which is surrounded by a ball cage 232 which guides locking of locking balls 234. In the relative position shown in FIG. 27 the locking balls 234 are clamped between the coupling section 230 and an inner circumferential surface of the second part-element 14b, so that the relative axial positions of the part-elements 14a and 14b are fixed. In particular, under the action of the diaphragm spring blade ends pressing against the disengagement bearing 18 the second part-element 14b cannot move relative to the first part-element 14a any farther in the direction toward the supporting element 12, since the diameter of the coupling section 230 increases in that direction.

Between the ball cage 232 and the second part-element 14b there acts a pre-stressing spring 220', which on the one hand fulfils a function similar to that of the pre-stressing spring 220 in the embodiment according to FIGS. 24 to 26, for setting a defined pre-load on the disengagement bearing 18, and on the other hand, in an operating position corresponding to FIG. 27, holds the locking balls 234 in clamping engagement with the coupling section 230 and the inner circumferential surface of the pot portion of the second part-element 14b.

To release the clamping engagement of the locking balls 234 in an adjustment operating condition, the supporting element 12 is made with a release stop 236 designed with a tapering sleeve portion, against which, at the end of the axial displacement path of the first part-element 14a toward a position corresponding to a fully engaged condition of the associated clutch, the ball cage 232 comes into contact, so that the ball cage with the locking balls 234 does not follow a final adjustment path increment as far as reaching the end position corresponding to the fully engaged condition, according to FIG. 26 farthest to the right, and is pushed together with the locking balls 234 by the release stop 236, relative to the part-element 14a still moving through the final adjustment path increment, in the direction toward the free end of the coupling section with the smallest diameter. The clamping engagement of the locking balls 234 is then released and, in collaboration with the diaphragm spring, the pre-load spring 220', which corresponds to a particular relative axial position between the part-elements 14a and 14b.

This adjustment of the pre-load and thus of the effective axial length of the actuating element 14 takes place, on the one hand, after the actuating module 10' has been assembled with an associated friction clutch to form a module for fitting, or after the actual module 10' has been assembled to the clutch previously already installed in the drivetrain while it is being incorporated in the drivetrain. For this it is only necessary to move the actuating element to the axial position that corresponds to a fully engaged condition of the clutch, which can be done by means of the actuator 44. On the other hand, this adjustment always takes place when the actuating element 14 adopts that axial position. This automatically results in compensation of the wear, for example due to abrasion of the friction linings of the clutch assembly. Decreasing thickness of the friction linings, for example of a friction-disk assembly in a clutch of the NC type having an ordinary structure, has the consequence that the diaphragm spring blade ends in the fully coupled condition move farther away from the clutch housing in the direction toward the transmission or the actuating module 10', which is compensated by a corresponding shortening of the effective overall length of the actuating element 14. Correspondingly, a displacement of the diaphragm spring blade ends due to wear in the opposite direction, i.e. away from the transmission or away from the actuating module 10' toward the clutch housing, which can sometimes occur depending on the design of the clutch, can also be compensated, namely by appropriately increasing the effective axial length of the actuating element 14.

In the axial end-position of the part-element 14a that corresponds to the decoupled condition, the pre-stressing spring 220' accordingly sets a certain relative axial position of the second part-element 14b in relation to the first part-element 14a. If then the clutch is partially or fully disengaged by axial displacement of the actuating element 14 in the direction toward the clutch, the coupling section 230 carries the ball cage 232 with it by virtue of the locking balls 234, so that the release stop 236 no longer acts upon the ball cage 232 and the pre-stressing spring 220' then re-establishes the clamping engagement of the locking balls 234 with the coupling section 230 and the inside circumference of the pot portion 14b and secures the relative axial position of the part-elements 14a and 14b reached on the basis of the adjustment by the pre-stressing spring 220'.

In the embodiment according to FIGS. 27 to 29 too, the actuator can in principle have any position relative to the other components of the actuating module, in particular relative to the gearwheel segment, for example with its rotation axis orthogonal to the transmission axis, since the drive output pinion 50 or another drive element and the gearwheel segment 39 do not change their relative position (apart from the rotation of the drive element and the gearwheel segment) during the adjustment of the pre-load and during the actuation of the clutch.

An embodiment of an actuating module 10', in which the actual actuating unit formed by the supporting element and the actuating element coaxial with it is integrated with an actuator arranged coaxially with it and comprising a rotor and a stator, is shown in FIGS. 30 to 32. Without placing any restriction on generality, a radially inner, stationary supporting element 12 is provided, and the outer actuating element 22, which carried the disengagement bearing 30, is made as a rotary member which can be driven in rotation by the actuator 44' by means of a gearwheel segment 38. The actuator 44' has a stator 250, which is arranged coaxially with the supporting element 12. The supporting element 12 and the stator 250 are seated on the outer circumference of a holding sleeve section 252 of the body component 34 and are therefore fixed axially and against rotation. On the holding sleeve 252 a rotor 256 of the actuator, which surrounds the stator 250 radially on the outside, is mounted to rotate by means of a rotary bearing 254. The stator and the rotor form an electric motor of the external-rotor type, thinking above all of a permanent-magnet motor in which the permanent magnets are arranged in the rotor. The stator contains coils for producing a rotation field, and associated electronics.

It should be noted that the bearing 254 can also fulfill an axial bearing function in relation to the rotor 256, so that during its rotation the rotor 256 adopts and maintains a defined axial position. On its outer circumference the rotor 256 is provided with a toothed rim or toothed rim section 260, which meshes with a two-step pinion 264 mounted on a bearing axis 262 of the body portion 34, or more precisely with a pinion section of the pinion having a larger diameter. A section of this pinion having a smaller diameter and a larger axial length meshes with the gearwheel segment 38, in order to drive the actuating element 22 in rotation in correspondence with the rotational movement of the rotor 256. By virtue of the engagement produced by rolling balls between the ball thread of the supporting element 12 and the actuating element 22, the rotational movement of the actuating element 22 results in an axial movement of the actuating element 22 together with the gearwheel segment 38, which is made possible by appropriate design of the teeth of the associated pinion section and the gearwheel segment.

The gearwheel segment 38 is formed by a segment section of a disk component 270, which has diametrically opposite it another segment section 272, which is made with a spring aperture for the stop-spring 208 and is coupled by means of the stop-spring 208 to an abutment disk component 202.

Thus, the rotational movement range and hence the axial movement range of the actuating element 22 are again elastically limited by the abutment disk component 202 mounted on the actuating element 22, which encounters stops on the body that correspond to fully engaged and fully disengaged conditions of the clutch and which transmits this stop action elastically to the actuating element 22 via the stop-spring 208.

A define pre-load on the disengagement bearing 30 can be established by adjusting an axial position of the entire system 10' relative to the clutch, or by adjusting the end-stop that corresponds to the fully engaged condition of the NC-type clutch.

The pre-stressing spring 62 is articulated to the segment section 272 of the disk component 270 which is opposite the gearwheel segment 38 and has the aperture for the stop-spring 208, so that in the case of a rotation stop adjustment no independent adjustment of the position of the pre-stressing spring 62 relative to the actuating element, and in particular no independent adjustment of the over-dead-point angle is possible. It would accordingly be conceivable to articulate the pre-stressing spring radially inside to the rotor and design the pinion 264 such that it can only be fitted once the pre-load has been set, in order to fix a relative rotation position between the rotor 256 and the gearwheel segment 38 which gives the desired configuration of the pre-stressing spring 62 and thus connect them so that they rotate together. This would require the use of a one-step pinion giving no step-down or step-up ratio.

It should be noted that in the embodiments and embodiment variants explained on the basis of FIGS. 1 to 29 as well, a one-step or multi-step intermediate wheel can be provided between the drive output element of the actuator and the gearwheel segment, in order to produce a higher or lower transmission ratio. The transmission ratio between the gearwheel segment and the motor depends on the disengagement path to be covered, the disengagement force required and the disengagement time, and also on the effective pitch of the engagement between the supporting element and the actuating element. Expressed conversely, the pitch of the ball thread depends on the disengagement path of the clutch to be covered and on the disengagement rotation angle of the actuator.

According to another possible variant of this embodiment an axially projecting bolt comprising the inner articulation point for the compensation spring 62 is provided on the other axial side of the disk component 270, wherefore a bolt on the body 34 that forms the radially outer articulation point for the compensation spring 62 is made correspondingly axially longer. The abutment disk component 202 can then be arranged on the side of the disk component 270 closer to the body component 34.

Another embodiment which also has a coaxially integrated actuator is shown in FIGS. 33 to 35. Again a central holding sleeve 252 which holds the stator 205 and the stationary supporting element 12 is provided, which is part of the body component 34. However the rotor, or external rotor 256 is not coupled to the actuating element 22 carrying the disengagement bearing 30 by a pinion and gearwheel segment, but by a sleeve-like coupling component 260 fixed on the outside of the actuating element 22 which has inner teeth 262 on an annular section, which engage in outer teeth 264 on the rotor 256. These tooth arrays are made as helical teeth and enable an axial displacement of the teeth 262 relative to the teeth 264 corresponding to the axial movement of the actuating element 22. A radially projecting disk segment of the coupling component 260 has a spring aperture for the stop-spring 208, for coupling to the abutment disk component 202. The compensation spring 62 is articulated on the inside, to an axially projecting articulation element of the coupling component 260.

A pre-load on the disengagement bearing 30 can again be set by appropriate axial positioning of the actuating module 10' relative to the clutch. Another possibility, for example, is to design the stops on the body so that they can rotate relative to the body position, in order to be able to adjust the end position of the actuating element 22 that corresponds to the engaged condition of the clutch. To be able to adjust the configuration of the pre-load spring 62 independently of this, it can be provided that the coupling component 260 can to begin with rotate relative to the actuating element 22 and then, only after setting a relative position of the coupling component 260 and the actuating element 22 which gives the desired configuration, fixing these to one another, for example by any connection means, by permanent welding, or else if necessary by an axial displacement of the coupling component 260 to bring it into interlocked rotation-driving engagement with the actuating element 22, possibly under the action of an axial force of an appropriately arranged spring assembly, such as the compensation spring 62.

The embodiments of the actuating module provided for the single clutch are also designed for integration in a clutch bell and can if necessary be combined with a clutch to form a structural unit for installation. If no wear compensation mechanism integrated in the actuating module or the respective actuating element is provided, the clutch or clutch assembly is preferably made with a wear compensation mechanism.

From the embodiments and design variants described and discussed above for the actuation of a single clutch, those with knowledge of the field can also derive corresponding embodiments and design variants for actuating a dual clutch. If necessary, corresponding components have to be duplicated, for example two coaxially integrated actuators, two abutment disk components with associated stop-springs respectively associated with one of the actuating elements or supporting elements, and if desired a respective axially displaceable design of the gearwheel segment to enable movement between an axial position coupled to the associated rotary member and an axial position decoupled therefrom. Furthermore, each of the two actuating elements of an actuating module for a dual clutch can be made with a respective integrated wear compensation mechanism.

The invention concerns an actuating device for applying actuating forces, in particular engagement or disengagement forces, in a friction clutch device in order to actuate at least one friction clutch assembly of the friction clutch device in the engagement or disengagement direction, and a torque transmission device comprising such an actuating device for torque transmission in a drivetrain of a motor vehicle between a drive unit and a transmission, which additionally contains the friction clutch device. The invention also concerns a method for the assembly of such a torque transmission device. Various aspects of the invention relate to the setting of a pre-load on at least one engagement bearing or disengagement bearing of the actuating device, to the setting of an over-dead-point configuration for at least one compensation spring associated with at lest one rotary member of the actuating device, to the setting of a rotational movement range of the rotary member and/or an axial displacement range of an actuating element that can be displaced axially by virtue of rotational movement imparted to the rotary member, to the production of a NC characteristic in the case of a NO friction clutch assembly or a NO characteristic in the case of a NC friction clutch assembly by the compensation spring, and to advantageous design solutions relating to the actuating device.

The invention claimed is:

1. A torque transmission device for transmitting torque in a drivetrain of a motor vehicle between a drive unit and a transmission, the torque transmission device comprising:
   a friction clutch device (120; 120') comprising at least one friction clutch assembly (122, 124; 122', 124') that is actuatable for engaging and disengaging;
   an actuating device (10; 10') for application of one of an engagement and disengagement force to the friction clutch device for actuating the at least one friction clutch assembly of the friction clutch device in one of an engagement and a disengagement direction, and the actuating device comprising:
      at least one axially displaceable actuating element (14, 22) associated with the at least one friction clutch assembly and at least one substantially axially fixed supporting element (12) associated with the actuating element such that the actuating element, when actuating the associated friction clutch assembly, is displaceable in an axial translation movement by virtue of at least one of rotational movement imparted to a rotary member of the actuating device (14; 22) and rotation forces exerted on the rotary member, the axial forces being exerted on the actuating element, due to both relative axial and rotational movement between the actuating element and the supporting element and the relative rotational movement having an adjustable range; such that either the actuating element or the supporting element serves as either the rotary member, or another rotary member separate from the actuating element but which co-operates therewith,
      at least one actuator (44, 45; 44; 45) associated with the rotary member and the friction clutch assembly, by which first rotation forces are exerted on the rotary member for actuating the friction clutch assembly, and the at least one actuator (44, 45; 44; 45) being supported by the body member,
      at least one compensation spring (60, 62; 60; 62) which is articulated to the rotary member, on one side, and to an arm of a body of the actuating device, on another side, such that second rotation forces produced by stressing of the compensation spring are exerted on the rotary member;
   one of:
      the friction clutch assembly is a normally-disengaged (NO) type of friction clutch assembly and by stressing the compensation spring, the second rotation force is exerted on the rotary member such that, without the action of the first rotation force, an actuating force produced by the actuating element is applied in the friction clutch device which holds the friction clutch in an engaged (NC) condition,
   and
      the friction clutch assembly (122; 124; 122', 124') is a normally-engaged (NC) type of friction clutch assembly and by stressing the compensation spring (60; 62), the second rotation force is exerted on the rotary member such that, without the action of the first rotation force, an actuating force produced by the actuating element is applied in the friction clutch device which retains the friction clutch in a disengaged (NO) condition.

2. The torque transmission device according to claim 1, wherein the compensation spring (60; 62) is articulated in an over-dead-point configuration to the rotary member (12; 14; 22), on the one side, and to the arm, on the other side, such that, in a first rotation position range of the rotary element, the second rotation force acts upon the rotary element in a first rotational direction and, in a second rotation position range, the second rotation force acts upon the rotary element, in a second rotational direction opposite to the first rotational direction, such that the first rotation position range contains an engagement rotation position of the rotary member in which the associated friction clutch assembly (122; 124; 122'; 124') is disengaged and, in the first rotation position range, the second rotation force acts in a direction toward the engagement rotation position whereas in the second rotation position range, the second rotation force acts in a direction toward a disengagement rotation position.

3. The torque transmission device according to claim 1, wherein one of:
   the friction clutch device is a single friction clutch device and comprises only one friction clutch assembly with which the at least one actuating element and the at least one actuator and the at least one compensation spring of the actuating device are associated,
   and
   the friction clutch device is a dual function clutch device (120; 120') and comprises a first friction clutch assembly with which a first actuating element (14) of the actuating device is associated, and a second friction clutch assembly with which a second actuating element (22) of the actuating device is associated, such that, the first friction clutch assembly is associated with at least a first actuator (44) and at least a first rotary member (14) and with at least one first compensation spring (60) of the actuating device and, the second friction clutch assembly is associated with at least a second actuator (45) and at least a second rotary member (27) and with at least one second compensation spring (62) of the actuating device.

4. The torque transmission device according to claim 1, wherein the actuating element (14; 22), associated with the respective friction clutch assembly or the supporting element (12) associated therewith, serves as the rotary member.

5. The torque transmission device according to claim 4, wherein the actuating element (14; 22) is the rotary member which is mounted to rotate relative to the stationary supporting element (12).

6. The torque transmission device according to claim 4, wherein the supporting element (12) is the rotary member which is mounted to rotate relative to the actuating element (14).

7. The torque transmission device according to claim 6, wherein the supporting element (12) is connected, via a rotary bearing arrangement (200) axially fixed to at least one of the body (34) and a stator of the actuator associated with the friction clutch assembly and an actuator holder that holds the actuator, is part of the body.

8. The torque transmission device according to claim 1, wherein either the at least one rotary member (12) is made with teeth that are one of directly and indirectly in rotation-driving engagement with a drive output (40; 42; 40') of the associated at least one actuator, and the teeth are provided on at least one gearwheel segment.

9. The torque transmission device according to claim 8, wherein a rotary component (38; 39), separate from the rotary member but arranged on the rotary member, or the gearwheel segment has the teeth such that, in a first relative position, the rotary component is uncoupled from the rotary member (12; 22) allowing the rotary component to rotate independently of the rotary member and, in a second relative position, the rotary component is coupled to the rotary member such that the rotary component and the rotary member rotate together, and the compensation spring (60; 62), associated with the rotary member, is articulated to the rotary component (38; 39) and is articulated to the rotary member, via the rotary component, only in the second relative position.

10. The torque transmission device according to claim 9, wherein at least one pre-stressing spring (220; 220'), which exerts pre-stressing forces on either the at least one actuating element or an actuating bearing of the actuating element by virtue of which a defined pre-stressing force, is set on the actuating bearing, in the case of the compensation spring (60; 62) in at least an adjustment operation mode independently of any action of the compensation spring upon the actuating element.

11. The torque transmission device according to claim 10, wherein the actuating element (14) comprises a first part-element (14*a*) which, by virtue of the rotational movement imparted to the rotary member, is displaced in an axial translation movement, and a second part-element (14*b*) comprises the actuating bearing (18) between which a wear compensation mechanism (220; 232; 234; 236) acts by which a relative axial position of the first and the second part-elements are adjustable.

12. The torque transmission device according to claim 11, wherein the pre-stressing spring (220') is part of the wear compensation mechanism such that, in a first operating condition, the pre-stressing spring locks a momentary relative axial position of the first and the second part-elements and by virtue of the pre-stressing spring, in a second operating condition which in the case of the compensation spring (60) corresponds to the adjustment operating mode, a defined pre-stressing force is set on the actuating bearing of the actuating element (14).

13. The torque transmission device according to claim 1, wherein a relative rotation position between at least one body portion (34) and at least one additional component (46; 48) that is fixed on the at least one body portion (34) is set, of which the additional component (46; 48) limits a rotation movement range of the at least one rotary member by at least one stop on at least one side, and retains the at least one respective actuator (44; 45), and comprises an articulation point for the at least one respective compensation spring (60; 62), and the body portion (34), by virtue of the supporting element (12) arranged rotationally fixed thereon, defines an axial position of the actuating element (14; 22) which corresponds to an abutment rotation position of the rotary member (14; 22).

14. The torque transmission device according to claim 1, wherein a stator (250) and a rotor (256) of the at least one actuator (44') are arranged coaxially with at least one of the rotary member (22) and the actuating element (2) and the supporting element (12).

15. The torque transmission device according to claim 1, wherein the supporting element (12) and the actuating element (14; 22) form a spindle-threaded nut arrangement.

16. The torque transmission device according to claim 1, wherein the supporting element (12') and the actuating element (14; 22) form a ball cage/threaded nut arrangement in which balls, held in defined positions by a ball cage, engage in either an inner thread or an outer thread of a threaded nut guided by the ball cage and the balls axially and radially and in a relative rotation direction.

17. The torque transmission device according to claim 1, wherein at least one stop-spring (80, 82; 86, 88; 208) limits, on at least one side, at least one of a rotation movement range of the rotary member and an axial displacement range of the actuating element.

18. The torque transmission device according to claim 1, wherein the rotary member or a gearwheel segment (38; 39) is couplable by a stop-spring to a rotary component (202) that rotates coaxially with the rotary member so that the rotary component (202) and the rotary member rotate together, and the rotary component is rotatable in at least one rotation direction as far as a stationary stop (210, 222).

19. The torque transmission device according to claim 18, wherein the stop-spring (208) engages both in a spring aperture of one of the rotary member or the gearwheel segment (38; 39) and also in a spring aperture of the rotary component (202).

20. The torque transmission device according to claim 1, wherein the friction clutch device (120; 120') comprises an input side (144) that is couplable to a drive output of the drive unit, and at least one output side (148, 150; 180; 182) of the friction clutch assembly, that is couplable to an input element of the transmission, a first output side associated with a first friction clutch assembly and a second output side associated with a second friction clutch assembly such that the input side is connectable via a supporting rotary bearing arrangement (32) to at least one of the body (34), the supporting element, a stator of the actuator associated with the friction clutch assembly and an actuator holder that holds the actuator, to form an axial support relationship, and the torque transmission device is pre-assembled to form a structural unit for installation that comprises the friction clutch assembly and the actuating device, which is installed, as a unit, between the drive unit and the transmission in the drivetrain without any need for at least partial repeated disassembly.

21. The torque transmission device according to claim 20, wherein, at least one of the following conditions are fulfilled for the pre-assembled structural unit for installation:
   a) in the pre-assembled structural unit for installation, a defined axial pre-load that acts upon one of an engagement bearing or an disengagement bearing (18; 30) of the associated actuating element is set, which is based on at least one of the second rotation force exerted on the at least one rotary member, and a force exerted by a force application element (134; 136; 134'; 136') of the associated friction clutch assembly, and an axial force of at least one pre-stressing spring (220; 220');
   b) in the pre-assembled structural unit for installation, in relation to the at least one compensation spring (60; 62), a defined over-dead-point configuration is set; and
   c) in the pre-assembled structural unit for installation, the at least one actuating element (14; 22) is fitted in a defined axial position relative to the input side and the body, to compensate for an axial position tolerance of the force application element of the associated friction clutch assembly.

22. A torque transmission device for transmitting torque in a drivetrain of a motor vehicle between a drive unit and a transmission, the torque transmission device comprising:
   a friction clutch device (120, 120') comprising at least one friction clutch assembly (122, 124; 122', 124) that is actuated for engaging and disengaging;
   an actuating device (10; 10') for applying either engagement or disengagement forces, in the friction clutch device, for actuating the at least one friction clutch assembly of the friction clutch device in an engagement or a disengagement direction, and the actuating device comprising:
      at least one axially displaceable actuating element (14, 22) associated with the friction clutch assembly and at least one substantially axially fixed supporting element (12) associated with the actuating element such that, during actuation of the associated friction clutch assembly, the actuating element is displaced in an axial translation movement by rotational movement imparted to a rotary member (14; 22) of the actuating device such that, due to both relative axial and rotational movement between the actuating element and the supporting element and the relative rotational movement having an adjustable range; one of the actuating element and the supporting element serves as the rotary member or as another rotary member separate from the actuating element and the supporting element, but which co-operates with therewith, and
      at least one actuator (44, 45; 44; 45) associated with the rotary member and the friction clutch assembly, by which first rotation forces are exerted on the rotary member to actuate the friction clutch assembly, and the at least one actuator (44, 45; 44; 45) being supported by the body member.

23. The torque transmission device according to claim 22, wherein the actuating device (10; 10') comprises at least one compensation spring (60, 62; 60; 62), which is articulated to the rotary member, on one side, and to an arm of a body of the actuating device, on another side, such that second rotation force produced by the stressing of the compensation spring are exerted on the rotary member; and one of:
      a defined pre-load on a disengagement bearing is adjustable;
      an over-dead point for the compression spring is adjustable;
      the adjustable range limit for one of the actuation element the rotary element is adjustable; and
      and the axially displaceable actuating element (14, 22) serves as one of the rotary member and the another rotary member separate from the actuating element but which co-operates therewith.

24. An actuating device for applying actuating forces in a friction clutch device in order to actuate at least one friction clutch assembly of the friction clutch device in either an engagement or a disengagement direction, the actuating device (10') comprising:
   at least one axially displaceable actuating element (14; 22) associated with the at least one friction clutch assembly and at least one essentially axially fixed supporting element (12) associated with the actuating element such that for actuation of the associated friction clutch assembly, by virtue of at least one of rotational movement imparted to a rotary member (12; 22) of the actuating device, the actuating element is displaced in an axial translation movement, due to both relative axial and rotational movement between the actuating element and the supporting element and the relative rotational movement having an adjustable range; and rotation forces exerted on the rotary member (12, 22), axial forces are exerted on the actuating element, the rotary member comprising teeth on a gearwheel segment (38; 39), which are connected to and rotationally-driven by a drive output of an associated actuator (44), and
   the teeth are located on a rotary component (38; 39) separate from but arranged on the rotary member such that, in a first relative position, the rotary component is decoupled from the rotary member (12; 22) to allow the rotary member to rotate independently of the rotary component and, in a second relative position, the rotary component is coupled to the rotary member so that the rotary member and the rotary component rotate together.

25. The actuating device according to claim 24, wherein by means of axial movement of the rotary component relative to the rotary member, driving formations on the rotary component (38; 39) and on the rotary member (12; 22) are brought from the first to the second relative position, into rotation-driving engagement.

26. The actuating device according to claim 24, wherein a compensation spring (60; 62), associated with the rotary member, is articulated to the rotary component (38; 39) and is articulated to the rotary member only in the second relative position, via the rotary component.

27. The actuating device according to claim 24, wherein axial positioning forces are exerted by a compensation spring (62) on the rotary component (38) to move the rotary component (38) from the first to the second relative position.

28. The actuating device according to claim 24, wherein at least one pre-stressing spring (220; 220') exerts pre-stressing forces on either the at least one actuating element or on an actuating bearing of the actuating element, by virtue of which a defined pre-stressing force is set on the at least one actuating bearing of the actuating element, in a case of a compensation spring at least in at least one adjustment operation mode independently of any action of the compensation spring upon the actuating element.

29. The actuating device according to claim 28, wherein the pre-stressing spring (220) acts between one of a body (34) and the supporting element (12), on one side, and the actuating element, on an other side.

30. The actuating device according to claim 28, wherein the actuating element (14) comprises a first part-element (14a) which, by virtue of the rotational movement imparted to the rotary member, is displaced in an axial translation movement, and a second part-element (14b) that comprises the actuating bearing (18) between which acts a wear compensation mechanism (220', 232, 234, 236) by which a relative axial position of the part-elements is adjusted.

31. An actuating device for the application of actuating forces in a friction clutch device to actuate at least one friction clutch assembly of the friction clutch device in one of an engagement or a disengagement direction, the actuating device (10) comprising:

at least one axially displaceable actuating element (14, 22) associated with the at least one friction clutch assembly, and at least one essentially axially fixed supporting element (12) associated with the actuating element such that to actuate the associated friction clutch assembly, by virtue of at least one of rotational movement imparted to a rotary member (14; 22) of the actuating device, the actuating element is displaced in an axial translation movement, and rotation forces exerted on the rotary member (14; 22) exert axial forces on the actuating element, wherein a relative rotational position is set between at least one body portion (34) and at least one additional component (46, 48) that can be fixed thereon, of which the additional component (46, 48), limits a rotation movement range of the at least one rotary member by at least one stop on at least one side, and retains the at least one respective actuator (44; 45), and comprises an articulation point for at least one respective compensation spring (60; 62), whereas the body portion (34), by virtue of the supporting element (12) arranged rotationally fixed thereon, defines an axial position of the actuating element (14; 22) which corresponds to an end-stop rotation position of the rotary member (14; 22).

32. The actuating device according to claim 31, wherein connection means (50, 52; 54, 56) act between the body portion and the additional component, are used as a rotation guide for fixing a set nominal rotation position.

33. The actuating device according to claim 31, wherein at least one of the body portion and the additional component has a slot (52; 56) extending in the rotational direction, and at least an other of the body portion and the additional component has at least one bolt (50; 54) which engages in the slot.

* * * * *